United States Patent
Rafique et al.

(10) Patent No.: US 12,113,568 B2
(45) Date of Patent: *Oct. 8, 2024

(54) LO PHASE CORRECTION FOR AAS WITH MULTIPLE RFIC

(71) Applicant: Telefonaktiebolaget LM Ericsson (publ), Stockholm (SE)

(72) Inventors: Raihan Rafique, Lund (SE); Joakim Hallin, Askim (SE); Dimitar Nikolov, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,313

(22) Filed: Jul. 26, 2023

(65) Prior Publication Data

US 2023/0370108 A1    Nov. 16, 2023

Related U.S. Application Data

(63) Continuation of application No. 17/719,745, filed on Apr. 13, 2022, now abandoned, which is a continuation of application No. 16/972,882, filed as application No. PCT/EP2018/064795 on Jun. 5, 2018, now Pat. No. 11,323,145.

(51) Int. Cl.
*H04B 1/401* (2015.01)
*H04B 7/10* (2017.01)
*H04B 17/11* (2015.01)
*H04B 17/21* (2015.01)

(52) U.S. Cl.
CPC .............. *H04B 1/401* (2013.01); *H04B 7/10* (2013.01); *H04B 17/11* (2015.01); *H04B 17/21* (2015.01)

(58) Field of Classification Search
CPC ........ H04B 1/401; H04B 17/11; H04B 17/14; H04B 17/21; H04B 7/10
See application file for complete search history.

(56) References Cited

U.S. PATENT DOCUMENTS

| | | |
|---|---|---|
| 5,557,623 A | 9/1996 | Discoll |
| 5,691,660 A | 11/1997 | Busch et al. |
| 6,295,027 B1 | 9/2001 | Wixforth et al. |
| 11,323,145 B2 * | 5/2022 | Rafique .................. H04B 1/401 |
| 2004/0092241 A1 | 5/2004 | Kim et al. |

(Continued)

FOREIGN PATENT DOCUMENTS

| | | |
|---|---|---|
| WO | 2013174807 A1 | 11/2013 |
| WO | 2016051406 A1 | 4/2016 |

(Continued)

OTHER PUBLICATIONS

International Search Report and Written Opinion for International Patent Application No. PCT/EP2018/064795, mailed Jan. 28, 2019, 9 pages.
Notice of Allowance for U.S. Appl. No. 16/972,882, mailed Jan. 5, 2022, 9 pages.
Non-Final Office Action for U.S. Appl. No. 17/719,745, mailed Oct. 27, 2022, 9 pages.

(Continued)

*Primary Examiner* — Nguyen T Vo
(74) *Attorney, Agent, or Firm* — Withrow & Terranova, PLLC

(57) ABSTRACT

Systems and methods are disclosed for correcting Local Oscillator (LO) phase misalignment between different Radio Frequency Integrated Circuits (RFIC) of an Advanced Antenna System (AAS).

21 Claims, 15 Drawing Sheets

(56) References Cited

U.S. PATENT DOCUMENTS

| | | | |
|---|---|---|---|
| 2005/0064892 A1 | 3/2005 | Cavin | |
| 2015/0139358 A1 | 5/2015 | Asuri et al. | |
| 2015/0256214 A1 | 9/2015 | Lee | |
| 2016/0036125 A1 | 2/2016 | Gupta et al. | |
| 2016/0308598 A1* | 10/2016 | Li | H04B 17/14 |
| 2017/0214427 A1* | 7/2017 | Chayat | H04B 17/12 |
| 2017/0310403 A1 | 10/2017 | Nardozza | |
| 2018/0131397 A1 | 5/2018 | Emadi et al. | |
| 2018/0367152 A1 | 12/2018 | Shibata | |
| 2019/0319717 A1* | 10/2019 | Choi | H04B 1/44 |
| 2019/0372218 A1* | 12/2019 | Vehovc | H04B 17/12 |
| 2020/0021295 A1 | 1/2020 | Remple et al. | |
| 2020/0252070 A1 | 8/2020 | Hirai et al. | |
| 2020/0288515 A1 | 9/2020 | Gupta | |
| 2020/0295765 A1 | 9/2020 | Agrawal et al. | |
| 2022/0123849 A1 | 4/2022 | McCall et al. | |
| 2022/0201603 A1 | 6/2022 | Klein et al. | |

FOREIGN PATENT DOCUMENTS

| | | |
|---|---|---|
| WO | 2017019365 A1 | 2/2017 |
| WO | 2018009106 A1 | 1/2018 |
| WO | 2019052655 A1 | 3/2019 |
| WO | 2019125236 A1 | 6/2019 |

OTHER PUBLICATIONS

Notice of Allowance for U.S. Appl. No. 17/719,745, mailed Apr. 27, 2023, 7 pages.

* cited by examiner

TX CHARACTERIZATION AND SELF-TEST: AEs CONFIGURED FOR TX (E.G., IN H-POLARIZATION)
RX CHARACTERIZATION AND SELF-TEST: AEs CONFIGURED FOR RX (E.G., IN H-POLARIZATION)

TX CHARACTERIZATION AND SELF-TEST: AE CONFIGURED FOR RX (E.G., IN V-POLARIZATION)
RX CHARACTERIZATION AND SELF-TEST: AE CONFIGURED FOR TX (E.G., IN V-POLARIZATION)

LO PHASE CORRECTION FOR AAS WITH MULTIPLE RFIC

This application is a continuation of U.S. patent application Ser. No. 17/719,745, filed Apr. 13, 2022, which is a continuation of U.S. patent application Ser. No. 16/972,882, filed Dec. 7, 2020, now U.S. Pat. No. 11,323,145, which is a 35 U.S.C. § 371 national phase filing of International Application No. PCT/EP2018/064795, filed Jun. 5, 2018, the disclosures of which are incorporated herein by reference in their entireties.

TECHNICAL FIELD

Systems and methods are disclosed herein that relate to an Advanced Antenna System (AAS) for a radio node such as, e.g., a base station in a cellular communications system and, more particularly, relate to systems and methods for Local Oscillator (LO) phase correction for an AAS with multiple Radio Frequency Integrated Circuits (RFICs) that share a common external LO reference.

BACKGROUND

An Advanced Antenna System (AAS) is an antenna system utilized by radio nodes, such as a base station in a cellular communications network, to perform analog beamforming. An AAS has many antenna elements, where each antenna element is connected to radio front-end that includes a transmitter and a receiver along with a phase tuner and a gain stage to apply desired phase and gain adjustments for, e.g., analog beamforming. Within the AAS, multiple Radio Frequency Integrated Circuits (RFICs) may be used, each having its own Radio Frequency (RF) and, in some cases, Intermediate Frequency (IF) mixing stages. A common Local Oscillator (LO) source is used to provide a reference LO signal to the RFICs. For very high frequencies, each RFIC may include circuitry (e.g., frequency multiplier(s) and/or divider(s)) used to translate the reference LO signal to the desired RF and, in some cases, IF frequencies. Generating the desired IF/RF frequencies on the RFIC is beneficial, particularly for very high frequencies, in order to avoid long routing and corresponding losses.

As described herein, the inventors have found that phase misalignment between different RFICs in such an AAS may occur. For instance, for high frequency, it is beneficial to use a scheme where each RFIC has circuitry to generate the RF LO, and in some cases the IF LO, from a lower frequency reference LO source. In such a case, the RF LO can be obtained by a frequency multiplier which is fed by the reference LO source, while the IF LO can be obtained from a frequency divider (divides by powers of 2) that is fed by RF LO. The inventors have found that, for LO generation circuitry designs that include a frequency divider, the generated LO may have a phase sift (e.g., a phase shift of 180 degrees in the case of a divide by 2). This can therefore lead to a situation where different RFICs that share a common external LO reference may not be phase aligned. This phase misalignment can adversely affect the performance of the system. As such, there is a need for systems and methods for correcting phase misalignment between multiple RFICs in an AAS.

SUMMARY

Systems and methods are disclosed for correcting Local Oscillator (LO) phase misalignment between different Radio Frequency Integrated Circuits (RFIC) of an Advanced Antenna System (AAS). In some embodiments, a system comprises a radio system comprising two or more RFICs. Each RFIC comprises LO generation circuitry, processing circuitry, and a plurality of antenna elements. The LO generation circuitry comprises a frequency divider. Using the frequency divider, the LO generation circuitry is configured to generate a LO signal based on a reference LO signal from an external LO source. The processing circuitry is configured to upconvert signals to be transmitted by the plurality of antenna elements and/or downconvert signals received via the plurality of antenna elements based on the LO signal. The system further comprises a processing unit adapted to, for a first RFIC pair comprising two of the two or more RFICs, namely a first RFIC and a second RFIC, obtain a first near-field power measurement via a receive antenna element located either in the first RFIC or the second RFIC while: (a) a test signal is transmitted via a first transmit antenna element located in the first RFIC and a second transmit antenna element located in the second RFIC, and (b) the phase state of the second RFIC is a first LO phase state. The first transmit antenna element for the first RFIC pair is one of the plurality of antenna elements located in the first RFIC that is configured as a transmit antenna element. The second transmit antenna element for the first RFIC pair is one of the plurality of antenna elements located in the second RFIC that is configured as a transmit antenna element. The receive antenna element for the first RFIC pair is either: (a) one of the plurality of antenna elements in the first RFIC that is configured as a receive antenna element or (b) one of the plurality of antenna elements comprised in the second RFIC that is configured as a receive antenna element. The processing unit is further adapted to, for the first RFIC pair, obtain a second near-field power measurement via the receive antenna element while a test signal is transmitted via the first transmit antenna element and the second transmit antenna element and the phase state of the second RFIC is a second LO phase state. In some embodiments, the second LO phase state is a state in which the phase of the LO signal for the second RFIC is shifted by 180 degrees relative to the phase of the LO signal for the second RFIC when the phase state of the second RFIC is the first LO phase state. The processing unit is further adapted to, for the first RFIC pair, determine which of the first LO phase state and the second LO phase state for the second RFIC results in phase alignment between the LO signals for the first RFIC and the second RFIC based on a predetermined relationship between near-field power measurements and phase alignment between the LO signals for the first RFIC and the second RFIC, and set the phase state of the second RFIC to the determined LO phase state. In this manner, LO phase misalignment between the pair of RFICs can quickly be detected and corrected.

In some embodiments, the first transmit antenna element, the second transmit antenna element, and the receive antenna element are chosen such that the coupling between the first transmit antenna element and the receive antenna element is symmetrical to the coupling between the second transmit antenna element and the receive antenna element. In addition or alternatively, in some embodiments, the first transmit antenna element, the second transmit antenna element, and the receive antenna element are chosen such that the coupling between the first transmit antenna element and the receive antenna element is not orthogonal to the coupling between the second transmit antenna element and the receive antenna element.

In some embodiments, for each RFIC of the two or more RFICs, the plurality of antenna elements comprised in the RFIC are dual-polarized antenna elements, the first transmit antenna element and the second transmit antenna element are configured in one polarization, while the receive antenna element is configured in the opposite polarization.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are misaligned when the phase state of the second RFIC is the first LO phase state and aligned when the phase state of the second RFIC is the second LO phase state; and, if the first near-field power measurement is not greater than the second near-field power measurement, then the phases of the LO signals for the first RFIC and the second RFIC are aligned when the phase state of the second RFIC is the first LO phase state and misaligned when the phase state of the second RFIC is the second LO phase state. The determined phase state for the second RFIC is the second LO phase state if the first near-field power measurement is greater than the second near-field power measurement and is the first LO phase state if the first near-field power measurement is not greater than the second near-field power measurement.

In some other embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are aligned when the phase state of the second RFIC is the first LO phase state and misaligned when the phase state of the second RFIC is the second LO phase state; and if the first near-field power measurement is not greater than the second near-field power measurement, then the phases of the LO signals for the first RFIC and the second RFIC are misaligned when the phase state of the second RFIC is the first LO phase state and aligned when the phase state of the second RFIC is the second LO phase state. The determined phase state for the second RFIC is the first LO phase state if the first near-field power measurement is greater than the second near-field power measurement and is the second LO phase state if the first near-field power measurement is not greater than the second near-field power measurement.

In some embodiments, the processing unit is further adapted to, for a second RFIC pair comprising two of the two or more RFICs, namely the first RFIC and a third RFIC, obtain a first near-field power measurement for the second RFIC pair via a receive antenna element for the second RFIC pair that is located either in the first RFIC or the third RFIC while: (a) a test signal is transmitted via a first transmit antenna element for the second RFIC pair that is located in the first RFIC and a second transmit antenna element for the second RFIC pair that is located in the third RFIC and (b) the phase state of the third RFIC is a first LO phase state. The first transmit antenna element for the second RFIC pair is one of the plurality of antenna elements comprised in the first RFIC that is configured as a transmit antenna element. The second transmit antenna element for the second RFIC pair is one of the plurality of antenna elements comprised in the third RFIC that is configured as a transmit antenna element. The receive antenna element for the second RFIC pair is either: (a) one of the plurality of antenna elements in the first RFIC that is configured as a receive antenna element or (b) one of the plurality of antenna elements in the third RFIC that is configured as a receive antenna element. The processing unit is further adapted to, for the second RFIC pair, obtain a second near-field power measurement via the receive antenna element for the second RFIC pair while a test signal is transmitted via the first transmit antenna element for the second RFIC pair and the second transmit antenna element for the second RFIC pair and the phase state of the third RFIC is a second LO phase state, wherein the second LO phase state is a state in which the phase of the LO signal for the third RFIC is shifted by 180 degrees relative to the phase of the LO signal for the third RFIC when the phase state of the third RFIC is the first LO phase state. The processing unit is further adapted to, for the second RFIC pair, determine which of the first LO phase state and the second LO phase state for the third RFIC results in phase alignment between the LO signals for the first RFIC and the third RFIC based on a predetermined relationship between near-field power measurements and phase alignment between the LO signals for the first RFIC and the third RFIC, and set the phase state of the third RFIC to the determined LO phase state.

In some embodiments, a system comprises a radio system comprising two or more RFICs. Each RFIC comprises LO generation circuitry, processing circuitry, and a plurality of antenna elements. The LO generation circuitry comprises a frequency divider. Using the frequency divider, the LO generation circuitry is configured to generate a LO signal based on a reference LO signal from an external LO source. The processing circuitry is configured to upconvert signals to be transmitted by the plurality of antenna elements and/or downconvert signals received via the plurality of antenna elements based on the LO signal. The system further comprises a processing unit adapted to, for a fist RFIC pair comprising two of the two or more RFICs, namely a first RFIC and a second RFIC, obtain a first near-field power measurement via a first receive antenna element located in the first RFIC and a second receive antenna element located in the second RFIC while: (a) a test signal is transmitted via a transmit antenna element located either in the first RFIC or the second RFIC and (b) a phase state of the second RFIC is a first LO phase state. The first receive antenna element for the first RFIC pair is one of the plurality of antenna elements in the first RFIC that is configured as a receive antenna element. The second receive antenna element for the first RFIC pair is one of the plurality of antenna elements in the second RFIC that is configured as a receive antenna element. The transmit antenna element for the first RFIC pair is either: (a) one of the plurality of antenna elements in the first RFIC that is configured as a transmit antenna element or (b) one of the plurality of antenna elements in the second RFIC that is configured as a transmit antenna element. The processing unit is further adapted to, for the first RFIC pair, obtain a second near-field power measurement via the first receive antenna element and the second receive antenna element while a test signal is transmitted via the transmit antenna element and the phase state of the second RFIC is a second LO phase state. In some embodiments, the second LO phase state is a state in which the phase of the LO signal for the second RFIC is shifted by 180 degrees relative to the phase of the LO signal for the second RFIC when the phase state of the second RFIC is the first LO phase state. The processing unit is further adapted to, for the first RFIC pair, determine which of the first LO phase state and the second LO phase state for the second RFIC results in phase alignment between the LO signals for the first RFIC and the second RFIC based on a predetermined relationship between near-field power measurements and phase alignment between the LO signals for the first RFIC and the second RFIC, and set the phase state of the second RFIC to the determined LO phase state.

In some embodiments, the first receive antenna element, the second receive antenna element, and the transmit antenna element are chosen such that the coupling between the first receive antenna element and the transmit antenna element is symmetrical to the coupling between the second receive antenna element and the transmit antenna element. In addition or alternatively, in some embodiments, the first receive antenna element, the second receive antenna element, and the transmit antenna element are chosen such that the coupling between the first receive antenna element and the transmit antenna element is not orthogonal to the coupling between the second receive antenna element and the transmit antenna element.

In some embodiments, for each RFIC of the two or more RFICs, the plurality of antenna elements comprised in the RFIC are dual-polarized antenna elements, the first receive antenna element and the second receive antenna element are configured in one polarization, and the transmit antenna element is configured in the opposite polarization.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are misaligned when the phase state of the second RFIC is the first LO phase state and aligned when the phase state of the second RFIC is the second LO phase state; and if the first near-field power measurement is not greater than the second near-field power measurement, then the phases of the LO signals for the first RFIC and the second RFIC are aligned when the phase state of the second RFIC is the first LO phase state and misaligned when the phase state of the second RFIC is the second LO phase state. The determined phase state for the second RFIC is the second LO phase state if the first near-field power measurement is greater than the second near-field power measurement and is the first LO phase state if the first near-field power measurement is not greater than the second near-field power measurement.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are aligned when the phase state of the second RFIC is the first LO phase state and misaligned when the phase state of the second RFIC is the second LO phase state; and, if the first near-field power measurement is not greater than the second near-field power measurement, then the phases of the LO signals for the first RFIC and the second RFIC are misaligned when the phase state of the second RFIC is the first LO phase state and aligned when the phase state of the second RFIC is the second LO phase state. The determined phase state for the second RFIC is the first LO phase state if the first near-field power measurement is greater than the second near-field power measurement and is the second LO phase state if the first near-field power measurement is not greater than the second near-field power measurement.

In some embodiments, the processing unit is further adapted to, for a second RFIC pair comprising two of the two or more RFICs, namely the first RFIC and a third RFIC, obtain a first near-field power measurement for the second RFIC pair via a first receive antenna element for the second RFIC pair that is located in the first RFIC and a second receive antenna element for the second RFIC pair that is located in the third RFIC while: (a) a test signal is transmitted via a transmit antenna element for the second RFIC pair that is located either in the first RFIC or the third RFIC and (b) a phase state of the third RFIC is a first LO phase state. The first receive antenna element for the second RFIC pair is one of the plurality of antenna elements comprised in the first RFIC that is configured as a receive antenna element. The second receive antenna element for the second RFIC pair is one of the plurality of antenna elements comprised in the third RFIC that is configured as a receive antenna element. The transmit antenna element for the second RFIC pair is either: (a) one of the plurality of antenna elements in the first RFIC that is configured as a transmit antenna element or (b) one of the plurality of antenna elements in the third RFIC that is configured as a transmit antenna element. The processing unit is further adapted to, for the second RFIC pair, obtain a second near-field power measurement via the first receive antenna element for the second RFIC pair and the second receive antenna element for the second RFIC pair while: (a) a test signal is transmitted via the transmit antenna element for the second RFIC pair and the phase state of the third RFIC is a second LO phase state, wherein the second LO phase state is a state in which the phase of the LO signal for the third RFIC is shifted by 180 degrees relative to the phase of the LO signal for the third RFIC when the phase state of the third RFIC is the first LO phase state. The processing unit is further adapted to, for the second RFIC pair, determine which of the first LO phase state and the second LO phase state for the third RFIC results in phase alignment between the LO signals for the first RFIC and the third RFIC based on a predetermined relationship between near-field power measurements and phase alignment between the LO signals for the first RFIC and the third RFIC, and set the phase state of the third RFIC to the determined LO phase state.

Embodiments of a method for self-testing a system to correct for LO phase misalignment between RFICs is also provided. In some embodiments, a method for self-testing of a system is provided, where the system comprises a radio system comprising two or more RFICs. Each RFIC comprises LO generation circuitry, processing circuitry, and a plurality of antenna elements. The LO generation circuitry comprises a frequency divider. Using the frequency divider, the LO generation circuitry is configured to generate a LO signal based on a reference LO signal from an external LO source. The processing circuitry is configured to upconvert signals to be transmitted by the plurality of antenna elements and/or downconvert signals received via the plurality of antenna elements based on the LO signal. The method comprises, for a first RFIC pair comprising two of the two or more RFICs, namely a first RFIC and a second RFIC, obtaining a first near-field power measurement via a receive antenna element located either in the first RFIC or the second RFIC while: (a) a test signal is transmitted via a first transmit antenna element located in the first RFIC and a second transmit antenna element located in the second RFIC and (b) a phase state of the second RFIC is a first LO phase state. The first transmit antenna element for the first RFIC pair is one of the plurality of antenna elements located in the first RFIC that is configured as a transmit antenna element.

The second transmit antenna element for the first RFIC pair is one of the plurality of antenna elements located in the second RFIC that is configured as a transmit antenna element. The receive antenna element for the first RFIC pair is either: (a) one of the plurality of antenna elements in the first RFIC that is configured as a receive antenna element or (b) one of the plurality of antenna elements in the second RFIC that is configured as a receive antenna element. The method further comprises, for the first RFIC pair, obtaining a second near-field power measurement via the receive antenna element while a test signal is transmitted via the first transmit antenna element and the second transmit antenna element and the phase state of the second RFIC is a second LO phase state. In some embodiments, the second LO phase state is a state in which the phase of the LO signal for the second RFIC is shifted by 180 degrees relative to the phase of the LO signal for the second RFIC when the phase state of the second RFIC is the first LO phase state. The method further comprises, for the first RFIC pair, determining which of the first LO phase state and the second LO phase state for the second RFIC results in phase alignment between the RF LO signals for the first RFIC and the second RFIC based on a predetermined relationship between near-field power measurements and phase alignment between the RF LO signals for the first RFIC and the second RFIC, and setting the phase state of the second RFIC to the determined LO phase state.

In some embodiments, the first transmit antenna element, the second transmit antenna element, and the receive antenna element are chosen such that the coupling between the first transmit antenna element and the receive antenna element is symmetrical to the coupling between the second transmit antenna element and the receive antenna element.

In some embodiments, for each RFIC of the two or more RFICs, the plurality of antenna elements comprised in the RFIC are dual-polarized antenna elements, the first and second transmit antenna elements are configured in a first polarization, and the receive antenna element is configured in a second polarization. In addition or alternatively, in some embodiments, the first transmit antenna element, the second transmit antenna element, and the receive antenna element are chosen such that the coupling between the first transmit antenna element and the receive antenna element is not orthogonal to the coupling between the second transmit antenna element and the receive antenna element.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are misaligned when the phase state of the second RFIC is the first LO phase state and aligned when the phase state of the second RFIC is the second LO phase state; and, if the first near-field power measurement is not greater than the second near-field power measurement, then the phases of the LO signals for the first RFIC and the second RFIC are aligned when the phase state of the second RFIC is the first LO phase state and misaligned when the phase state of the second RFIC is the second LO phase state. Determining which of the first LO phase state and the second LO phase state for the second RFIC results in phase alignment between the LO signals for the first RFIC and the second RFIC comprises: determining that the second LO phase state for the second RFIC results in phase alignment between the LO signals for the first RFIC and the second RFIC if the first near-field power measurement is greater than the second near-field power measurement, and determining that the first LO phase state for the second RFIC results in phase alignment between the LO signals for the first RFIC and the second RFIC if the first near-field power measurement is not greater than the second near-field power measurement.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are aligned when the phase state of the second RFIC is the first LO phase state and misaligned when the phase state of the second RFIC is the second LO phase state; and, if the first near-field power measurement is not greater than the second near-field power measurement, then the phases of the LO signals for the first RFIC and the second RFIC are misaligned when the phase state of the second RFIC is the first LO phase state and aligned when the phase state of the second RFIC is the second LO phase state. Determining which of the first LO phase state and the second LO phase state for the second RFIC results in phase alignment between the LO signals for the first RFIC and the second RFIC comprises: determining that the first LO phase state for the second RFIC results in phase alignment between the LO signals for the first RFIC and the second RFIC if the first near-field power measurement is greater than the second near-field power measurement, and determining that the second LO phase state for the second RFIC results in phase alignment between the LO signals for the first RFIC and the second RFIC if the first near-field power measurement is not greater than the second near-field power measurement.

In some embodiments, the method further comprises, for a second RFIC pair comprising two of the two or more RFICs, namely the first RFIC and a third RFIC, obtaining a first near-field power measurement for the second RFIC pair via a receive antenna element for the second RFIC pair that is located either in the first RFIC or the third RFIC while: (a) a test signal is transmitted via a first transmit antenna element for the second RFIC pair that is located in the first RFIC and a second transmit antenna element for the second RFIC pair that is located in the third RFIC and (b) a phase state of the third RFIC is a first LO phase state. The first transmit antenna element for the second RFIC pair is one of the plurality of antenna elements in the first RFIC that is configured as a transmit antenna element. The second transmit antenna element for the second RFIC pair is one of the plurality of antenna elements in the third RFIC that is configured as a transmit antenna element. The receive antenna element for the second RFIC pair is either: (a) one of the plurality of antenna elements in the first RFIC that is configured as a receive antenna element or (b) one of the plurality of antenna elements in the third RFIC that is configured as a receive antenna element. The method further comprises, for the second RFIC pair, obtaining a second near-field power measurement via the receive antenna element for the second RFIC pair while a test signal is transmitted via the first transmit antenna element for the second RFIC pair and the second transmit antenna element for the second RFIC pair and the phase state of the third RFIC is a second LO phase state, wherein the second LO phase state is a state in which the phase of the LO signal for the third RFIC is shifted by 180 degrees relative to the phase of the LO signal for the third RFIC when the phase state of the third RFIC is the first LO phase state. The method further comprises, for the second RFIC pair, determining which of the first LO phase state and the second LO phase state for the third RFIC results in phase alignment between the LO signals for the first RFIC and the third RFIC based on a predetermined relationship between near-field power measurements and phase alignment between the LO signals for the first RFIC and the third RFIC, and setting the phase state of the third RFIC to the determined LO phase state.

In some embodiments, a method for self-testing of a system is provided, where the system comprises a radio system comprising two or more RFICs. Each RFIC comprises LO generation circuitry, processing circuitry, and a plurality of antenna elements. The LO generation circuitry comprises a frequency divider. Using the frequency divider, the LO generation circuitry is configured to generate a LO signal based on a reference LO signal from an external LO source. The processing circuitry is configured to upconvert signals to be transmitted by the plurality of antenna elements and/or downconvert signals received via the plurality of antenna elements based on the LO signal. The method comprises, for a first RFIC pair comprising two of the two or more RFICs, namely a first RFIC and a second RFIC, obtaining a first near-field power measurement via a first receive antenna element located in the first RFIC and a second receive antenna element located in the second RFIC while: (a) a test signal is transmitted via a transmit antenna element located either in the first RFIC or the second RFIC and (b) a phase state of the second RFIC is a first LO phase state. The first receive antenna element is one of the plurality of antenna elements in the first RFIC that is configured as a receive antenna element. The second receive antenna element is one of the plurality of antenna elements in the second RFIC that is configured as a receive antenna element. The transmit antenna element is either: (a) one of the plurality of antenna elements in the first RFIC that is configured as a transmit antenna element or (b) one of the plurality of antenna elements in the second RFIC that is configured as a transmit antenna element. The method further comprises, for the first RFIC pair, obtaining a second near-field power measurement via the first receive antenna element and the second receive antenna element while a test signal is transmitted via the transmit antenna element and the phase state of the second RFIC is a second LO phase state. In some embodiments, the second LO phase state is a state in which the phase of the LO signal for the second RFIC is shifted by 180 degrees relative to the phase of the LO signal for the second RFIC when the phase state of the second RFIC is the first LO phase state. The method further comprises, for the first RFIC pair, determining which of the first LO phase state and the second LO phase state for the second RFIC results in phase alignment between the LO signals for the first RFIC and the second RFIC based on a predetermined relationship between near-field power measurements and phase alignment between the LO signals for the first RFIC and the second RFIC, and setting the phase state of the second RFIC to the determined LO phase state.

In some embodiments, the first receive antenna element, the second receive antenna element, and the transmit antenna element are chosen such that the coupling between the first receive antenna element and the transmit antenna element is symmetrical to the coupling between the second receive antenna element and the transmit antenna element. In addition or alternatively, in some embodiments, the first receive antenna element, the second receive antenna element, and the transmit antenna element are chosen such that the coupling between the first receive antenna element and the transmit antenna element is not orthogonal to the coupling between the second receive antenna element and the transmit antenna element.

In some embodiments, for each RFIC of the two or more RFICs, the plurality of antenna elements comprised in the RFIC are dual-polarized antenna elements, the first receive element and the second receive antenna element are configured in one polarization, and the transmit antenna element is configured in the opposite second polarization.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are misaligned when the phase state of the second RFIC is the first LO phase state and aligned when the phase state of the second RFIC is the second LO phase state; and, if the first near-field power measurement is not greater than the second near-field power measurement, then the phases of the LO signals for the first RFIC and the second RFIC are aligned when the phase state of the second RFIC is the first LO phase state and misaligned when the phase state of the second RFIC is the second LO phase state. Determining which of the first LO phase state and the second LO phase state for the second RFIC results in phase alignment between the LO signals for the first RFIC and the second RFIC comprises: determining that the second LO phase state for the second RFIC results in phase alignment between the LO signals for the first RFIC and the second RFIC if the first near-field power measurement is greater than the second near-field power measurement, and determining that the first LO phase state for the second RFIC results in phase alignment between the LO signals for the first RFIC and the second RFIC if the first near-field power measurement is not greater than the second near-field power measurement.

In some embodiments, the predetermined relationship between near-field power measurements and phase alignment between the LO signals for the first RFIC and the second RFIC is that: if the first near-field power measurement is greater than the second near-field power measurement, then the phases of the LO signals for the first RFIC and the second RFIC are aligned when the phase state of the second RFIC is the first LO phase state and misaligned when the phase state of the second RFIC is the second LO phase state; and, if the first near-field power measurement is not greater than the second near-field power measurement, then the phases of the LO signals for the first RFIC and the second RFIC are misaligned when the phase state of the second RFIC is the first LO phase state and aligned when the phase state of the second RFIC is the second LO phase state. Determining which of the first LO phase state and the second LO phase state for the second RFIC results in phase alignment between the LO signals for the first RFIC and the second RFIC comprises: determining that the first LO phase state for the second RFIC results in phase alignment between the LO signals for the first RFIC and the second RFIC if the first near-field power measurement is greater than the second near-field power measurement, and determining that the second LO phase state for the second RFIC results in phase alignment between the LO signals for the first RFIC and the second RFIC if the first near-field power measurement is not greater than the second near-field power measurement.

In some embodiments, the method further comprises for a second RFIC pair comprising two of the two or more RFICs, namely the first RFIC and a third RFIC, obtaining a first near-field power measurement for the second RFIC pair via a first receive antenna element for the second RFIC pair that is located in the first RFIC and a second receive antenna element for the second RFIC pair that is located in the third RFIC while: (a) a test signal is transmitted via a transmit antenna element for the second RFIC pair that is located either in the first RFIC or the third RFIC and (b) a phase state of the third RFIC is a first LO phase state. The first receive antenna element for the second RFIC pair is one of the plurality of antenna elements in the first RFIC that is configured as a receive antenna element. The second receive antenna element for the second RFIC pair is one of the plurality of antenna elements in the third RFIC that is configured as a receive antenna element. The transmit antenna element for the second RFIC pair is either: (a) one of the plurality of antenna elements in the first RFIC that is configured as a transmit antenna element or (b) one of the plurality of antenna elements comprised in the third RFIC that is configured as a transmit antenna element. The method further comprises, for the second RFIC pair, obtaining a second near-field power measurement via the first receive antenna element for the second RFIC pair and the second receive antenna element for the second RFIC pair while a test signal is transmitted via the transmit antenna element for the second RFIC pair and the phase state of the third RFIC is a second LO phase state, wherein the second LO phase state is a state in which the phase of the LO signal for the third RFIC is shifted by 180 degrees relative to the phase of the LO signal for the third RFIC when the phase state of the third RFIC is the first LO phase state. The method further comprises, for the second RFIC pair, determining which of the first LO phase state and the second LO phase state for the third RFIC results in phase alignment between the LO signals for the first RFIC and the third RFIC based on a predetermined relationship between near-field power measurements and phase alignment between the LO signals for the first RFIC and the third RFIC, and setting the phase state of the third RFIC to the determined LO phase state.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
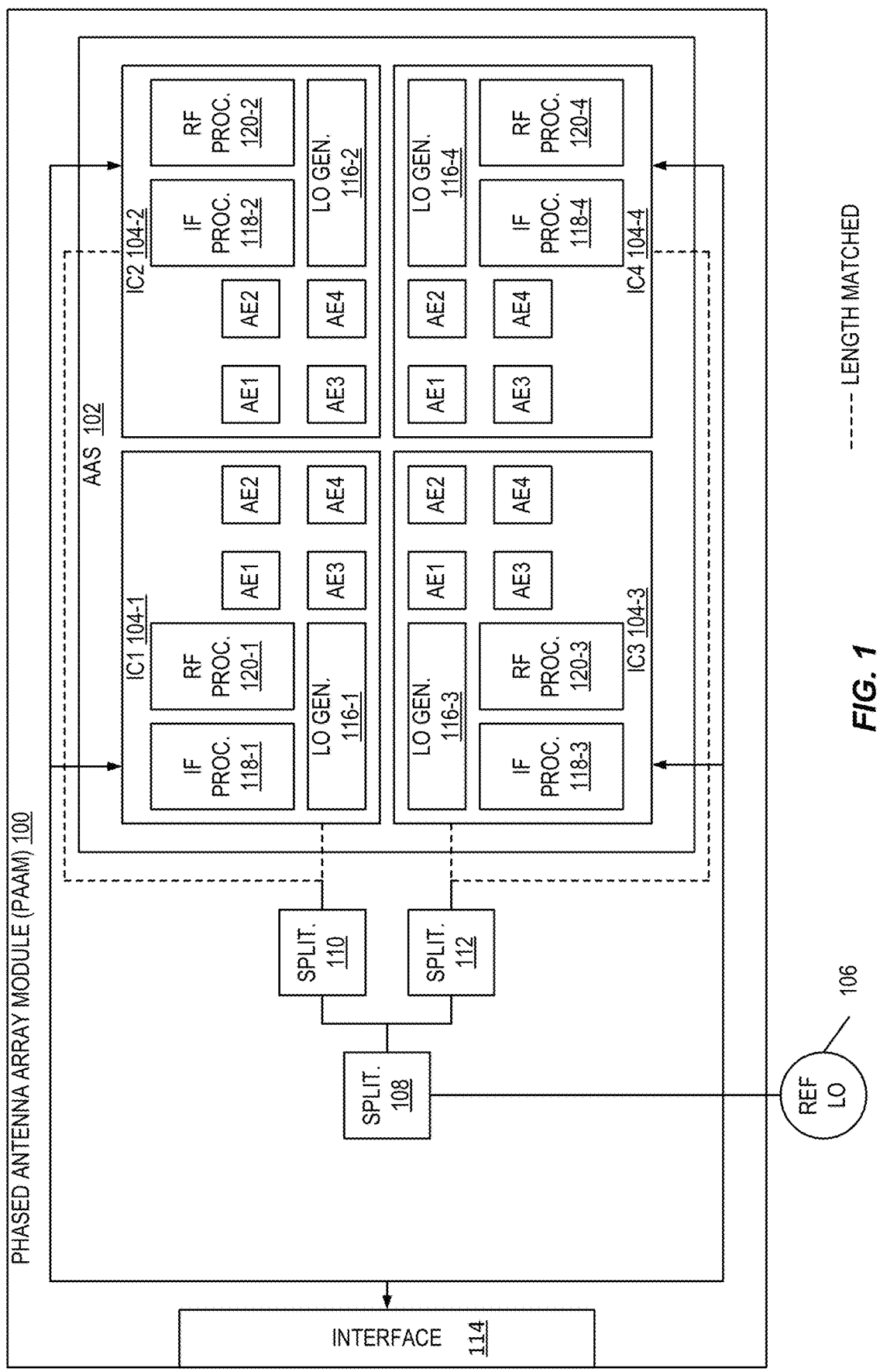
FIG. 1 illustrates one example of a radio system including an Advanced Antenna System (AAS) including multiple Radio Frequency Integrated Circuits (RFICs) in accordance with some embodiments of the present disclosure.

Systems and methods for correcting phase misalignment between multiple Radio Frequency Integrated Circuits (RFICs) in an Advanced Antenna System (AAS) are disclosed. In this regard, FIG. 1 illustrates one example of a radio system, which in this disclosure is referred to as a Phased Antenna Array Module (PAAM) 100, that includes an AAS 102 including multiple RFICs 104-1 through 104-4 in accordance with some embodiments of the present disclosure. Note that while there are four RFICs 104 in this example, the PAAM 100 may include any number of two or more RFICs 104. In this example, each of the RFICs 104 includes four Antenna Elements (AEs), which are referenced as AE1-AE4. Note, however, that each RFIC 104 may include any number of two or more AEs. As another example, each RFIC 104 may alternatively include 16 AEs.

The RFICs 104-1 through 104-4 receive a reference Local Oscillator (LO) signal from an external reference LO source 106 through a network of splitters 108 through 112. In this example, the reference LO source 106 is "external" in that it is external to the RFICs 104-1 through 104-4. In this example, the reference LO source 106 is external to the PAAM 100. Note that the connectors that connect the outputs of the splitters 110 and 112 to the RFICs 104-1 through 104-4 are matched length connectors (i.e., have the same length). In absence of length matching, calibration data can be used to synchronize the LOs of different RFICs 104. The AAS 102, and in particular the RFICs 104-1 through 104-4, are connected to an interface 114 to a processing unit (e.g., processing unit 500 of FIG. 5). As discussed below, the interface 114 provides an interface to a processing unit (e.g., processing unit 500 of FIG. 5), where the processing unit, for example, provides baseband transmit signals to the PAAM 100 for transmission by the AAS 102 and receives baseband receive signals from the PAAM 100. In addition, as discussed below, the processing unit interacts with the PAAM 100 to perform a self-test procedure.

The RFICs 104-1 through 104-4 include LO generation circuitry 116-1 through 116-4, Intermediate Frequency (IF) processing circuitry 118-1 through 118-4, Radio Frequency (RF) processing circuitry 120-1 through 120-4, and multiple AEs (AE1 through AE4). In the example embodiments described herein, the AEs are arranged in a matrix, or grid. For each RFIC 104, the LO generation circuitry 116 generates an IF LO signal and an RF LO signal based on the reference LO signal using, e.g., one or more frequency multipliers and/or one or more frequency dividers. The IF processing circuitry 118 uses the IF LO signal to upconvert baseband transmit signals received from the processing unit from baseband to IF and to downconvert IF receive signals received from the RF processing circuitry 120 from IF to baseband. The RF processing circuitry 120 uses the RF LO signal to upconvert IF transmit signals received from the IF processing circuitry 118 from IF to RF and to downconvert RF receive signals received from the AEs (AE1 through AE4) from RF to IF. Note that, in the example embodiments described herein, the LO generation circuitry 116 generates separate IF LO signals for transmit and receive and generates separate RF LO signals for transmit and receive.

Figure 2:
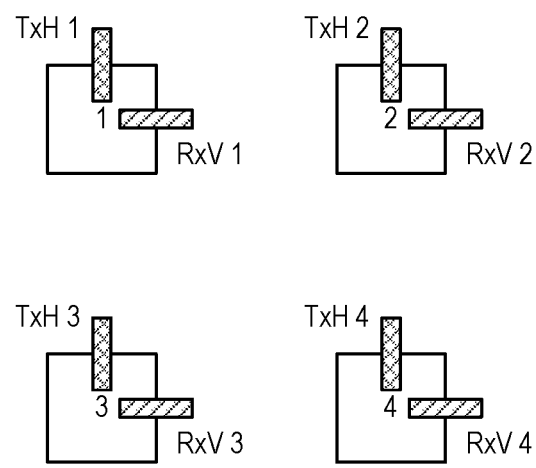
FIG. 2 illustrates one example of dual-polarized antenna elements.

In some embodiments, the AEs (AE1 through AE4) of the RFICs 104-1 through 104-4 are dual-polarized. As an example, FIG. 2 illustrates one example of the AEs (AE1 through AE4) of an RFIC 104 where the AEs (AE1 through AE4) are dual-polarized.

Figure 3:
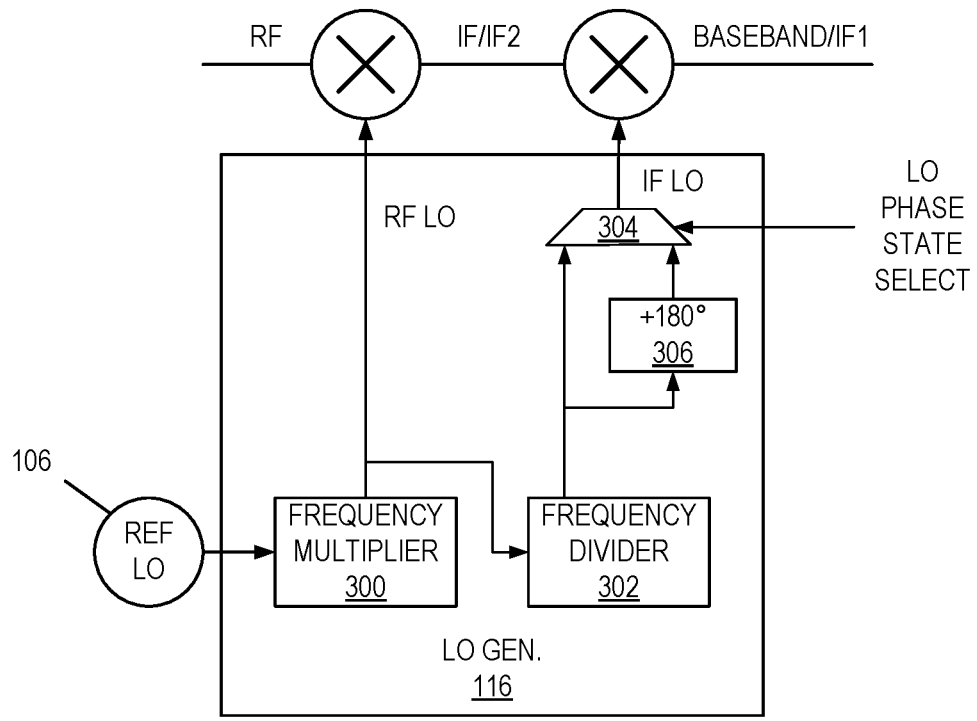
FIG. 3 illustrates one example of the Intermediate Frequency (IF) and Radio Frequency (RF) Local Oscillator (LO) generation circuitry included in an RFIC of an AAS in accordance with some embodiments of the present disclosure.

FIG. 3 illustrates one example of the LO generation circuitry 116. In this example, the LO generation circuitry 116 includes a frequency multiplier 300 that translates the reference LO signal from some reference LO frequency to a desired frequency for translating from the desired transmit/receive RF frequency and a desired IF frequency of the transmit/receive signal. The resulting LO signal is referred to herein as the RF LO signal. The LO generation circuitry 116 also includes a frequency divider 302 that translates the RF LO signal to a desired frequency for translating between the desired IF frequency of the transmit/receive signal and either baseband or some other IF frequency (denoted in FIG. 3 as IF2).

Figure 4:
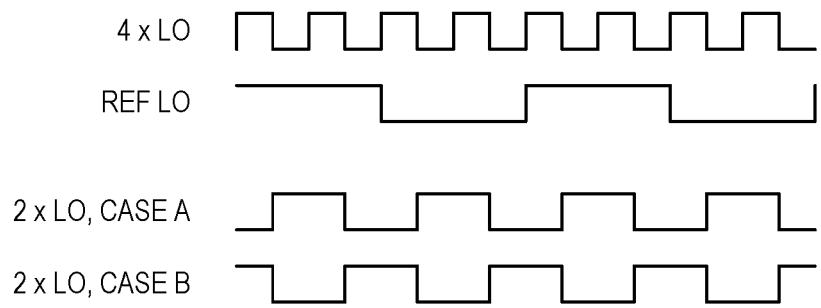
FIG. 4 illustrates one example of two possible LO signals that can occur due to a frequency divider.

FIG. 4 illustrates the LO phase mismatch problem that can occur between the different RFICs 104-1 through 104-4 that results from the circuitry used to implement the frequency divider 302. In this example, the reference LO (REF LO) is first multiplied by 4 to generate the RF LO (4 x LO). The RF LO is then divided by 2 to generate the divided signal (i.e., 2 x LO). As can be seen in FIG. 4, as a result of the circuitry used to implement the frequency divider 302, the divided signal (2xLO signal) could have either a rising edge or a falling edge in reference to the RF LO (i.e., the 4xLO signal).

Thus, when each RFIC 104 has its own LO generation circuitry 116 including a frequency multiplier/divider, sometimes the generated LO signals between RFICs 104 are out of phase with each other. This phase-misalignment of the LO signals in different RFICs 104 occurs even though the actual reference LO signals used by the RFICs 104 are phase aligned. Thus, inside the RFICs 104, the IF/RF LO signals can be randomly out of phase.

As described herein, the LO phase state of the LO generation circuitry 116 is controlled such that respective LO signals of different RFICs 104 are phase-aligned. In particular, in the example of FIG. 4, the divided LO signal output by the frequency divider 302 is provided to one input of a multiplexer, or switch, 304. In addition, phase-shifting circuitry 306 applies a 180 degree phase shift to the divided LO signal. The phase-shifting circuitry 306 may be implemented to, e.g., phase invert the divided LO signal by flipping p and n in a differential buffer, the positive and negative parts of a differential pair. The resulting phase-shifted, divided LO signal is provided to another input of the multiplexer 304. The multiplexer 304 outputs the divided LO signal as the IF LO signal when configured in a first LO phase state and outputs the phase-shifted, divided LO signal as the IF LO signal when configured in a second LO phase state. The LO phase state of the LO generation circuitry 116 is controlled via a LO phase state select input (e.g., digital input written to a register), which is provided by, e.g., the processing unit via the interface 14.

Note that the example of the LO generation circuitry 116 illustrated in FIG. 3 is only an example. In general, the LO generation circuitry 116 is any circuitry that generates, based on reference LO signal provided by an external LO source, a LO signal using a frequency divider. Further, while the two LO phase states are provided by the multiplexer 304 and the phase-shifting circuitry 306 at the output of the frequency divider 302 in the example of FIG. 3, the present disclosure is not limited thereto. Other types of configurations for providing the different LO phase states can be used, as will be appreciated by one of ordinary skill in the art upon reading this disclosure.

It should also be noted that while a 180 degree phase shift is described herein, other phase-shift amounts may be used. For example, a 180 degree phase shift is suitable when the frequency divider 302 is a divide by 2. However, if the frequency divider 302 divides by some other number (e.g., 4, 8, 16, etc.), other phase-shift amounts (e.g., 90 degree phase shift, 45 degree phase shift, etc.) can be used.

Figure 5:
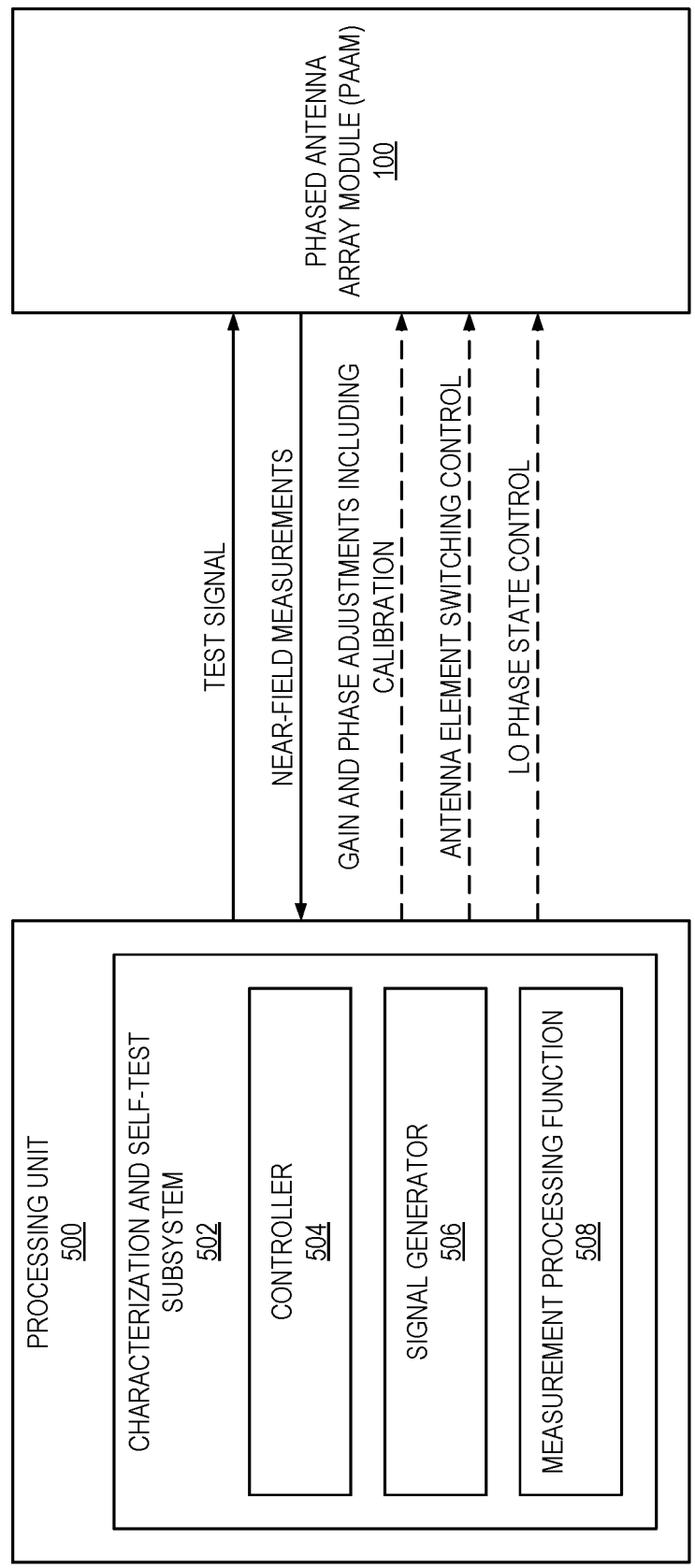
FIG. 5 illustrates one example of a system that performs a characterization and self-test procedure to correct the phase error between different RFICs of the AAS of FIG. 1.

FIG. 5 illustrates a system including the PAAM 100 of FIG. 1 and a processing unit 500 including a characterization and self-test subsystem 502 that operates to correct the LO misalignment between the different RFICs 104-1 through 104-4 of the AAS 102 of the PAAM 100 in accordance with embodiments of the present disclosure. The characterization and self-test subsystem 502 may be implemented in hardware or a combination of hardware and software (e.g., software being executed by one or more processor(s)). Note that, while illustrated separately, in some embodiments, the processing unit 500 and, in particular, the characterization and self-test subsystem 502, can be implemented in the PAAM 100.

The characterization and self-test subsystem 502 includes a controller 504 that operates to, e.g., control the activation and configuration of the antenna elements of the RFICs 104-1 through 104-4 during characterization and self-testing, control a phase state of each of the RFICs 104-1 through 104-4, etc. The characterization and self-test subsystem 502 also includes a signal generator 506 that operates to, e.g., generate test signals and provide those test signals to the PAAM 100 for transmission during calibration and self-testing. The test signals may be, e.g., pseudo-random signals or single tone signals. The characterization and self-test subsystem 502 also includes a measurement processing function 508 that receives near-field measurements from the PAAM 100 during calibration and self-testing and processes those measurements as described herein. Note that, as used herein, a "near field" measurement is a measurement obtained by a receive antenna element(s) in an RFIC(s) 104 of the PAAM 100 during transmission of a test signal via a transmit antenna element(s) in an RFIC(s) 104 of the PAAM 100. Conversely, a "far field" measurement is: (a) a measurement made at a remote receiver during transmission of a test signal by the PAAM 100; or (b) a measurement made via a receive antenna element(s) of an RFIC(s) 104 of the PAAM 100 during transmission of a test signal by a remote transmitter.

Figure 6:
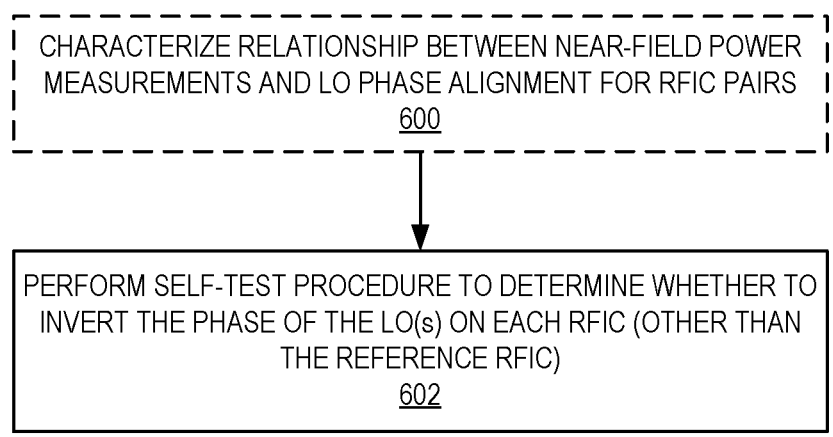
FIG. 6 is a flow chart that illustrates the operation of the processing unit of FIG. 5 to perform a characterization and self-test procedure in accordance with embodiments of the present disclosure.

FIG. 6 illustrates the operation of the processing unit 500, and in particular the characterization and self-test subsystem 502, in accordance with some embodiments of the present disclosure. Here, a dashed box represents an optional step. As illustrated, the characterization and self-test subsystem 502 characterizes a relationship between near-field power measurements and LO phase alignment for multiple RFIC pairs (step 600). Each RFIC pair includes a reference RFIC. The reference RFIC is one of the RFICs 104. The characterization and self-test subsystem 502 performs a self-test procedure to determine whether to invert the phase of the LO(s) on each RFIC 104 (other than the reference RFIC) (step 602). Note that while illustrated together, the characterization procedure of step 600 and the self-test procedure of step 602 do not need to be performed by the same processing unit 500 for the same PAAM 100. For example, one processing unit 500 may be used to perform the characterization procedure for one PAAM 100, and the results of the characterization may be used by another processing unit 500 for another PAAM 100. In other words, characterization may, in some embodiments, be performed once for a particular PAAM design and the results of the characterization then used for self-testing of each PAAM 100 produced for that PAAM design.

Figure 7:
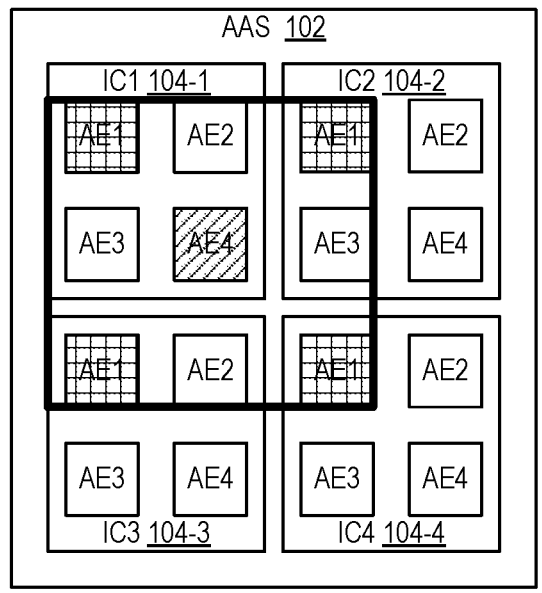
FIG. 7 illustrates one example of how the antenna elements of adjacent RFICs are configured for the characterization and self-test procedure.
Figure 7:
Figure 7:

FIG. 7 illustrates an example antenna element configuration utilized for characterization and self-testing in accordance with some embodiments of the present disclosure. As illustrated, when performing transmit characterization (e.g., in step 600 of FIG. 6), AE4 on RFIC 104-1 is activated and configured as a receive antenna element (e.g., in vertical polarization (V-polarization), AE1 on RFIC 104-1 is activated and configured as a (reference) transmit antenna element (e.g., in horizontal polarization (H-polarization), and the AE1s of RFICs 104-2, 104-3, and 104-4 are, for respective iterations of the procedure, activated and configured as transmit antenna elements (e.g., in H-polarization). Note that the selection of AE4 on RFIC 104-1 as the receive AE is only an example. Any AE having symmetrical or non-orthogonal coupling with the selected transmit AEs on RFICs 104-1 through 104-4 can be used.

More specifically, when performing transmit characterization, the controller 504 activates AE4 on RFIC 104-1 and configures it as a receive antenna element (e.g., in vertical polarization (V-polarization). The controller 504 also activates AE1 on RFIC 104-1 and configures it as a (reference) transmit antenna element (e.g., in H-polarization). Then, multiple iterations of the characterization procedure are performed for each pair of RFICs 104. These pairs of RFICs 104 are: (IC1, IC2), (IC1, IC3), and (IC1, IC4). Note that RFIC 104-1 is also referred to herein as IC1, RFIC 104-2 is also referred to herein as IC2, etc.

More specifically, for a first iteration of transmit characterization, the controller 504 activates AE1 on RFIC 104-2 and configures it as a transmit antenna element (e.g., in H-polarization). The signal generator 506 generates a test signal and provides the test signal to the PAAM 100 for transmission via AE1 on RFIC 104-1 and AE1 on RFIC 104-2. Due to coupling between the AEs, during transmission of the test signal, a coupled signal is received via AE4 on RFIC 104-1. The power of this received signal is measured (e.g., on the PAAM 100), and the measurement is provided to the measurement processing function 508 where the measurement is stored as a first near-field power measurement. During characterization, a corresponding far-field power measurement is also obtained and stored as a first far-field power measurement.

The controller 504 then switches the LO phase state of RFIC 104-2. More specifically, when obtaining the first near-field and far-field power measurements, the LO phase state of the RFIC 104-2 is set to some initial LO phase state, which is referred to here as a first LO phase state. The controller 504 switches the LO phase state of the RFIC 104-2 to a second LO phase state in which the phase of the LO signal for the RFIC 104-2 is shifted by 180 degrees with respect to the phase of the LO signal for the RFIC 104-2 when the RFIC 104-2 is in the first LO phase state. The switching of the phase state of the RFIC 104-2 may be performed by providing an appropriate digital input (e.g., the LO phase state select signal in the example of FIG. 3) to the LO generation circuitry 116. The signal generator 506 then generates a test signal and provides the test signal to the PAAM 100 for transmission via AE1 on RFIC 104-1 and AE1 on RFIC 104-2 while the RFIC 104-2 is in the second LO phase state. Again, due to coupling between the AEs, during transmission of the test signal, a coupled signal is received via AE4 on RFIC 104-1. The power of this received signal is measured (e.g., on the PAAM 100), and the measurement is provided to the measurement processing function 508 where the measurement is stored as a second near-field power measurement. A corresponding far-field power measurement is also obtained and stored as a second far-field power measurement. This process is then repeated for each of the remaining RFIC pairs.

During characterization, it is known that the signals transmitted from the two transmit AEs will constructively combine when the LO phases on the two RFICs IC1 and ICx (where x=2, 3, or 4) are aligned. As such, for each RFIC pair (IC1, ICx), if the first far-field power measurement is greater than the second far-field power measurement, it can be determined that the LO phases of the two RFICs IC1 and ICx are aligned when the RFIC ICx is in the first LO phase state. Otherwise, it can be determined that that the LO phases of the two RFICs IC1 and ICx are aligned when the RFIC ICx is in the second LO phase state. For each RFIC pair (IC1, ICx), using this information and the first and second near-field power measurements for the RFIC pair (IC1, ICx), the measurement processing function 508 can determine a relationship between near-field power measurements for the two RFICs IC1 and ICx and the LO phase alignment of the two RFICs IC1 and ICx. This can be expressed by the following truth table:

| $P_{1,x,far} >$ $P_{1,inv(x),far}$ | $P_{1,x,near} >$ $P_{1,inv(x),near}$ | $B_{1,x}$ |
|---|---|---|
| False | False | True |
| False | True | False |
| True | False | False |
| True | True | True | where $P_{1,x,far}$ is the first far-field power measurement for the RFIC pair (IC1, ICx), $P_{1,inv(x),far}$ is the second far-field power measurement for the RFIC pair (IC1,ICx), $P_{1,x,near}$ is the first near-field power measurement for the RFIC pair (IC1,ICx), $P_{1,inv(x),near}$ is the second near-field power measurement for the RFIC pair (IC1,ICx), and $B_{1,x}$ is a Boolean variable that represents the relationship between the far-field and near-field measurements for the RFIC pair (IC1,ICx). As can be seen from the table, the Boolean variable $B_{1,x}$ is TRUE when the far-field and near-field measurements are positively correlated, i.e. $(P_{1,x,near} > P_{1,inv(x),near}) == (P_{1,x,far} > P_{1,inv(x),far})$; and $B_{1,x}$ is FALSE when the far-field and near-field measurements are negatively correlated, i.e. $(P_{1,x,near} > P_{1,inv(x),near})$ is not equal to $T(P_{1,x,far} > P_{1,inv(x),far})$. Note that the far-field measurements are directly related to the LO phase state of the RFIC ICx for which the LOs for the RFIC pair (IC1,ICx) are aligned, i.e. if $(P_{1,x,far} > P_{1,inv(x),far})$ is TRUE it means that the LOs of the RFIC pair (IC1,ICx) are aligned when the LO phase state of the RFIC ICx is the first LO phase state, otherwise the LOs of the RFIC pair (IC1,ICx) are aligned when the LO phase state of the RFIC ICx is the second LO phase state. Therefore, for an RFIC pair (IC1,ICx), the Boolean variable $B_{1,x}$ captures the relationship between the near-field measurements and the LO phase state of the RFIC ICx for which the LO phases for the RFIC pair (IC1,ICx) are aligned (i.e., the LO signals of RFICs IC1 and ICx are phase-aligned). Once determined, the Boolean values $B_{1,x}$ are stored and used for subsequent self-testing of the PAAM 100 and/or used for subsequent testing of other PAAMs 100 (by storing the Boolean values $B_{1,x}$ in the processing units 500 used for other PAAMs 100).

A similar characterization procedure can be performed for receive operation.

As illustrated, when performing transmit self-testing (e.g., in step 602 of FIG. 6), AE4 on RFIC 104-1 is activated and configured as a receive antenna element (e.g., in V-polarization), AE1 on RFIC 104-1 is activated and configured as a (reference) transmit antenna element (e.g., in horizontal polarization (H-polarization), and the AE1s of RFICs 104-2, 104-3, and 104-4 are, for respective iterations of the procedure, activated and configured as transmit antenna elements (e.g., in H-polarization).

More specifically, when performing transmit self-testing, the controller 504 activates AE4 on RFIC 104-1 and configures it as a receive antenna element (e.g., in V-polarization). The controller 504 also activates AE1 on RFIC 104-1 and configures it as a (reference) transmit antenna element (e.g., in H-polarization). Then, multiple iterations of the self-testing procedure are performed for each pair of RFICs 104. These pairs of RFICs 104 are: (IC1, IC2), (IC1, IC3), and (IC1, IC4). Note that RFIC 104-1 is also referred to herein as IC1, RFIC 104-2 is also referred to herein as IC2, etc.

More specifically, for a first iteration of transmit self-testing, the controller 504 activates AE1 on RFIC 104-2 and configures it as a transmit antenna element (e.g., in H-polarization). The signal generator 506 generates a test signal and provides the test signal to the PAAM 100 for transmission via AE1 on RFIC 104-1 and AE1 on RFIC 104-2. Due to coupling between the AEs, during transmission of the test signal, a coupled signal is received via AE4 on RFIC 104-1. The power of this received signal is measured (e.g., on the PAAM 100), and the measurement is provided to the measurement processing function 508 where the measurement is stored as a first near-field power measurement.

The controller 504 then switches a LO phase state of the RFIC 104-2. More specifically, when obtaining the first near-field and far-field power measurements, the LO phase state of the RFIC 104-2 is set to some initial LO phase state, which is referred to here as a first LO phase state. The controller 504 switches the LO phase state of the RFIC 104-2 to a second LO phase state in which the phase of the LO signal for the RFIC 104-2 is shifted by 180 degrees with respect to the phase LO signal for the RFIC 104-2 when the RFIC 104-2 is in the first LO phase state. The signal generator 506 then generates a test signal and provides the test signal to the PAAM 100 for transmission via AE1 on RFIC 104-1 and AE1 on RFIC 104-2 while the RFIC 104-2 is in the second LO phase state. Again, due to coupling between the AEs, during transmission of the test signal, a coupled signal is received via AE4 on RFIC 104-1. The power of this received signal is measured (e.g., on the PAAM 100), and the measurement is provided to the measurement processing function 508 where the measurement is stored as a second near-field power measurement. The process is repeated for each of the other RFIC pairs.

During self-testing, for each RFIC pair (IC1,ICx), the expression $P_{1,x,near} > P_{1,inv(x),near}$ is compared against the Boolean variable $B_{1,x}$ representing the relationship between the near-field measurements and the LO phase state of the RFIC ICx for which the LO phases of the RFIC pair (IC1,ICx) are aligned. If the comparison is TRUE (i.e., if $(P_{1,x,near} > P_{1,inv(x),near}) == B_{1,x}$), then the controller 504 determines that the LO phases of the RFIC pair (IC1,ICx) are aligned when the LO phase state of the RFIC ICx is the first LO phase state. Otherwise, the controller 504 determines that the LO phases of the RFIC pair (IC1,ICx) are aligned when the LO phase state of the RFIC ICx is the second LO phase state. The controller 504 then sets the LO phase state of RFIC ICx to the phase state that results in LO phase alignment.

Figure 8:
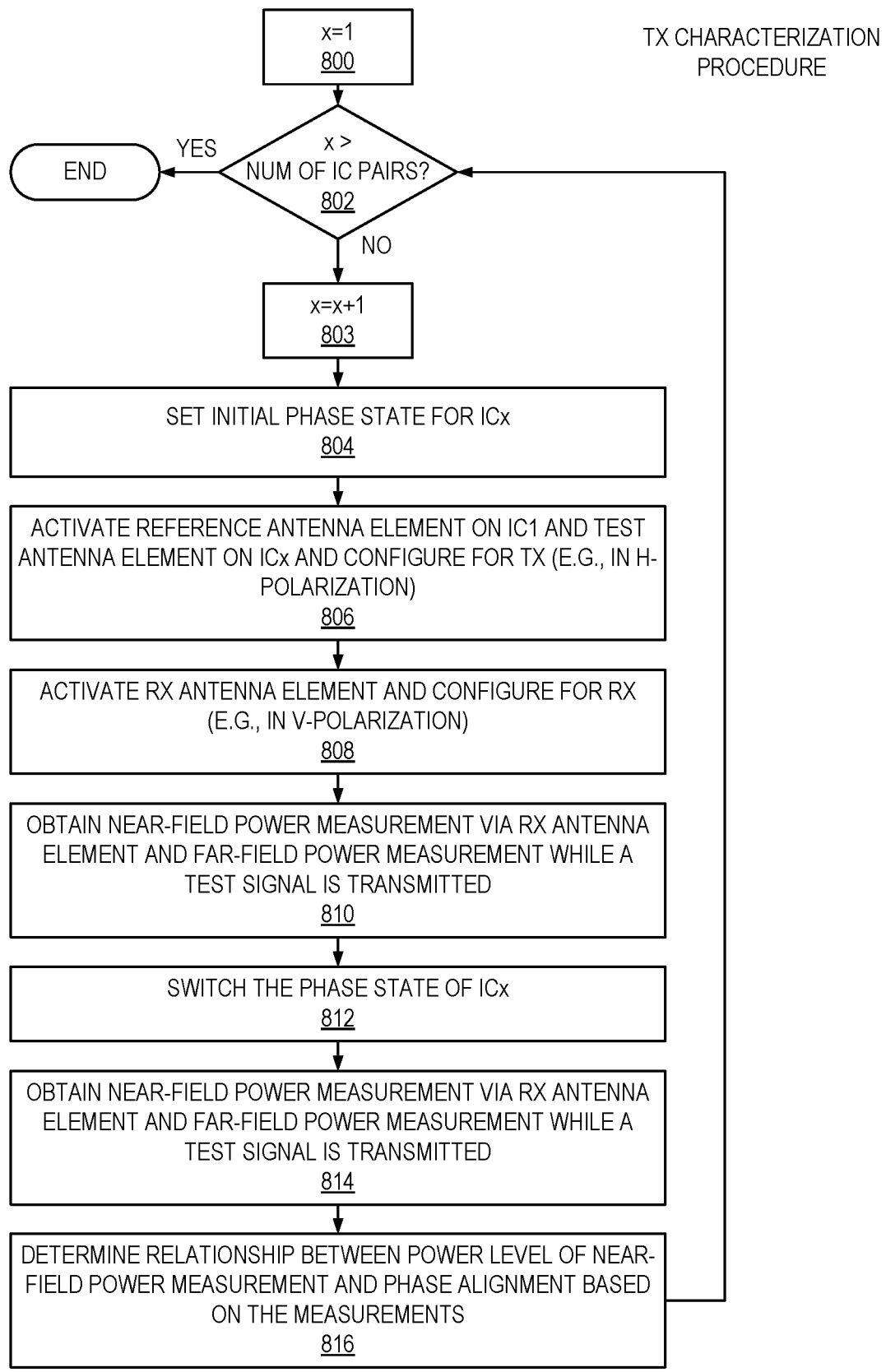
FIG. 8 is a flow chart that illustrates a characterization procedure for transmit LOs in accordance with some embodiments of the present disclosure.
Figure 9:
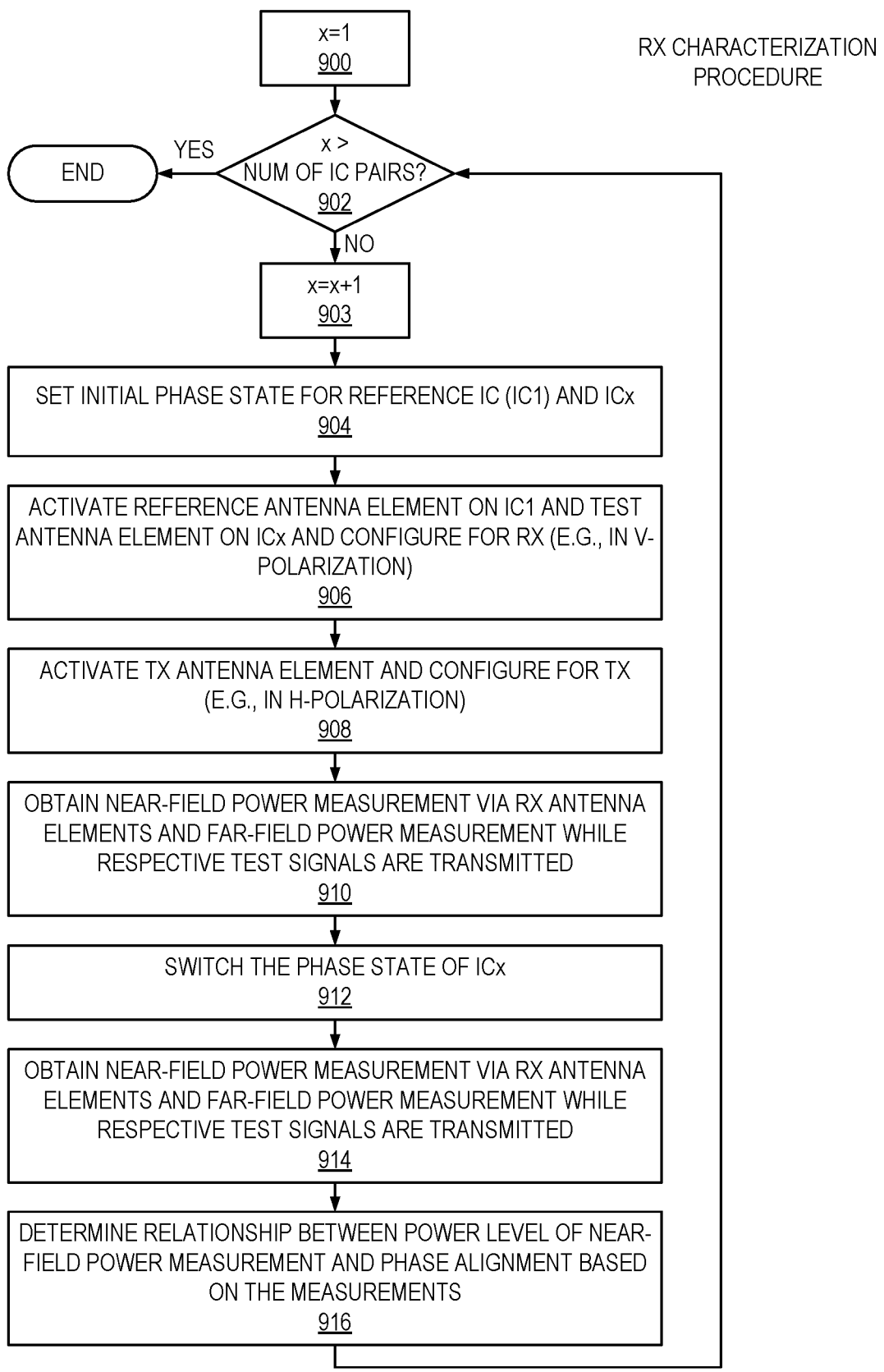
FIG. 9 is a flow chart that illustrates a characterization procedure for receive LOs in accordance with some embodiments of the present disclosure.

FIGS. 8 and 9 are flow charts that illustrate the characterization procedure of step 600 of FIG. 6 in more detail in accordance with some embodiments of the present disclosure. FIG. 8 illustrates a characterization procedure for the transmit LOs of the RFICs 104, and FIG. 9 illustrates a characterization procedure for the receive LOs of the RFICs 104.

As illustrated in FIG. 8, for transmit, the controller 504 of the characterization and self-testing subsystem 502 initializes an index x to a value of 1 (step 800). If the value of x is not greater than the number of RFIC pairs to be processed for the characterization procedure (step 802, NO), the controller 504 increments x (step 803) and sets an initial phase state for RFIC ICx to the first LO phase state (step 804). The controller 504 activates the reference antenna element (e.g., AE1) on the reference RFIC IC1 and activates a test antenna element (e.g., AE1) on RFIC ICx and configures these two antenna elements as transmit antenna elements, e.g., in the H-polarization (step 806). In addition, the controller 504 activates an antenna element either on RFIC IC1 or ICx (e.g., AE4 on RFIC IC1) and configures that antenna element as a receive antenna element, e.g., in the V-polarization (step 808).

While a test signal is transmitted by the PAAM 100 using the two transmit antenna elements and the LO phase state of RFIC ICx is set to the first LO phase state, the characterization and self-test subsystem 502 obtains a first near-field power measurement ($P_{1,x,near}$) via the receive antenna element and also obtains a corresponding first far-field power measurement ($P_{1,x,far}$) (step 810). More specifically, the controller 504 causes the signal generator 506 to generate a test signal and provide the test signal to the PAAM 100 for transmission via the two transmit antenna elements. Due to coupling, a resulting signal is received at the receive antenna element. A power of this signal is measured in the PAAM 100 (e.g., in the respective RFIC) to thereby provide the first near-field power measurement ($P_{1,x,near}$), which is sent to the processing unit 500 and stored. The first far-field power measurement ($P_{1,x,far}$) is made by a remote receiver and returned to the processing unit 500 and stored.

The controller 504 switches the LO phase state of the RFIC ICx from the first LO phase state to the second LO phase state such that the phase of the LO signal for the RFIC ICx is shifted by 180 degrees (step 812). While a test signal is transmitted by the PAAM 100 using the two transmit antenna elements and the LO phase state of RFIC ICx is set to the second LO phase state, the characterization and self-test subsystem 502 obtains a second near-field power measurement ($P_{1,inv(x),near}$) via the receive antenna element and also obtains corresponding second far-field power measurement ($P_{1,inv(x),far}$) (step 814). More specifically, the controller 504 causes the signal generator 506 to generate a test signal and provide the test signal to the PAAM 100 for transmission via the two transmit antenna elements. Due to coupling, a resulting signal is received at the receive antenna element. A power of this signal is measured in the PAAM 100 (e.g., in the respective RFIC) to thereby provide the second near-field power measurement ($P_{1,inv(x),near}$), which is sent to the processing unit 500 and stored. The second far-field power measurement ($P_{1,inv(x),far}$) is made by a remote receiver and returned to the processing unit 500 and stored.

The controller 504 then determines a relationship (e.g., $B_{1,x}$) between the power level of the near-field power measurements for the RFIC pair (IC1,ICx) and the LO phase alignment for the RFIC pair (IC1,ICx) based on the near-field and far-field measurements, as discussed above (step 816). This relationship is stored. The process returns to step 802 and is repeated until the last RFIC pair has been processed.

As illustrated in FIG. 9, for receive characterization, the controller 504 of the characterization and self-test subsystem 502 initializes an index x to a value of 1 (step 900). If the value of x is not greater than the number of RFIC pairs to be processed for the characterization procedure (step 902, NO), the controller 504 increments x (step 903) and sets an initial phase state for RFIC ICx to the first LO phase state (step 904). The controller 504 activates the reference antenna element (e.g., AE1) on the reference RFIC IC1 and activates a test antenna element (e.g., AE1) on RFIC ICx and configures these two antenna elements as receive antenna elements, e.g., in the V-polarization (step 906). In addition, the controller 504 activates an antenna element either on RFIC IC1 or ICx (e.g., AE4 on RFIC IC1) and configures that antenna element as a transmit antenna element, e.g., in the H-polarization (step 908).

While a test signal is transmitted by the PAAM 100 using the transmit antenna element and the LO phase state of RFIC ICx is set to the first LO phase state, the characterization and self-test subsystem 502 obtains a first near-field power measurement ($P_{1,x,near}$) via the receive antenna elements and also obtains a corresponding first far-field power measurement ($P_{1,x,far}$) (step 910). Note that the corresponding first far-field power measurement ($P_{1,x,far}$) is obtained based on a separate signal transmitted to the PAAM 100 from a far-field transmitter. More specifically, the controller 504 causes the signal generator 506 to generate a test signal and provide the test signal to the PAAM 100 for transmission via the transmit antenna element. Due to coupling, resulting signals are received at the two receive antenna elements. These two receive signals are combined and a power measurement of this combined signal is made in the PAAM 100 (e.g., in the respective RFIC) to thereby provide the first near-field power measurement ($P_{1,x,near}$), which is sent to the processing unit 500 and stored. The first far-field power measurement ($P_{1,x,far}$) is made based on a signal transmitted by a far-field transmitter that is received via the two receive antenna elements.

The controller 504 switches the LO phase state of the RFIC ICx from the first LO phase state to the second LO phase state such that the phase of the LO signal for the RFIC ICx is shifted by 180 degrees (step 912). While a test signal is transmitted by the PAAM 100 using the transmit antenna element and the LO phase state of RFIC ICx is set to the second LO phase state, the characterization and self-test subsystem 502 obtains a second near-field power measurement ($P_{1,inv(x),near}$) via the two receive antenna elements and also obtains a corresponding second far-field power measurement ($P_{1,inv(x),far}$) (step 914).

The controller 504 then determines a relationship (e.g., $B_{1,x}$) between the power level of the near-field power measurements for the RFIC pair (IC1,ICx) and the LO phase alignment for the RFIC pair (IC1,ICx) based on the near-field and far-field measurements, as discussed above (step 916). This relationship is stored. The process returns to step 902 and is repeated until the last RFIC pair has been processed.

Figure 10:
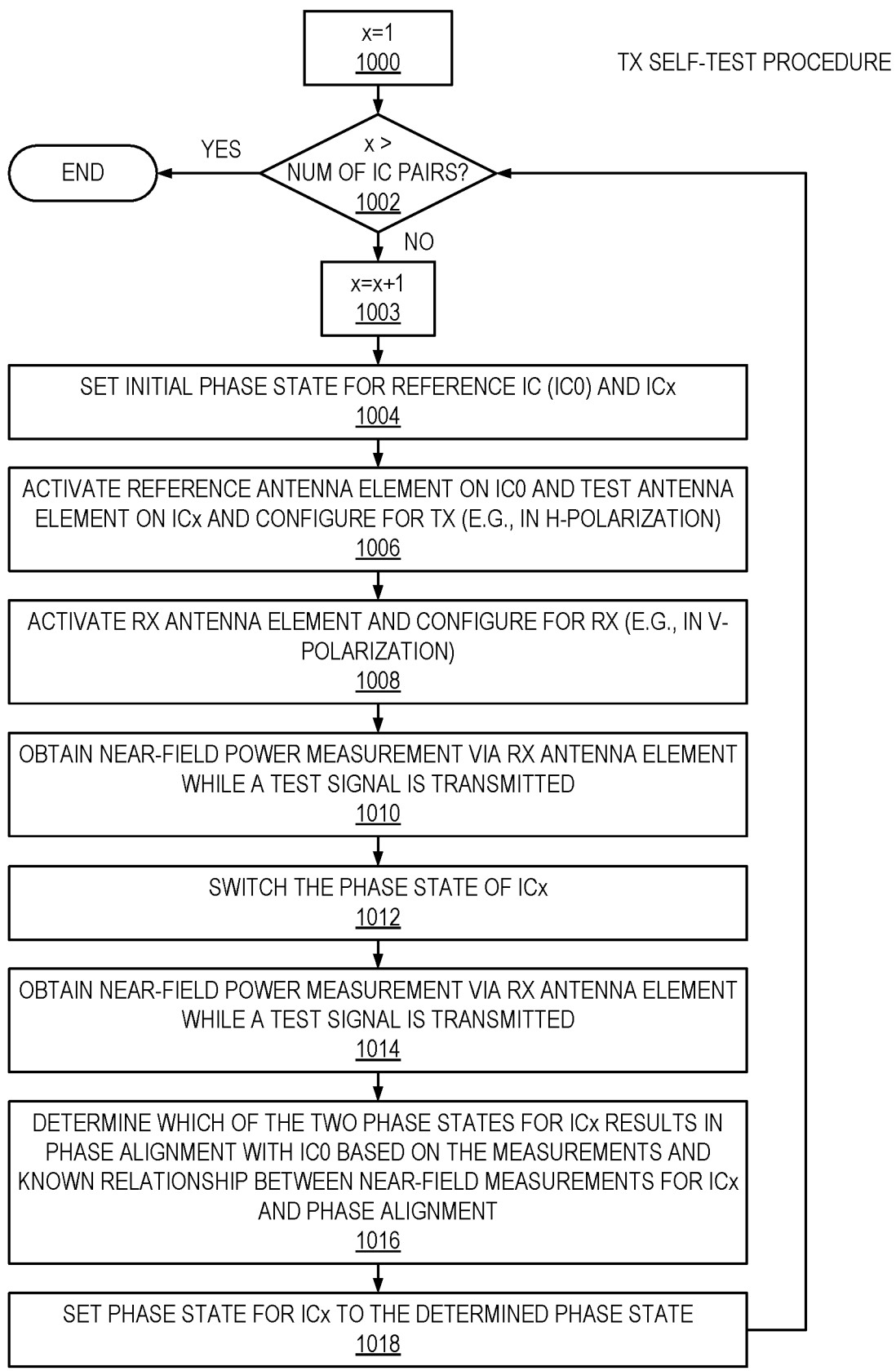
FIG. 10 is a flow chart that illustrates a self-test procedure for transmit LOs in accordance with some embodiments of the present disclosure.
Figure 11:
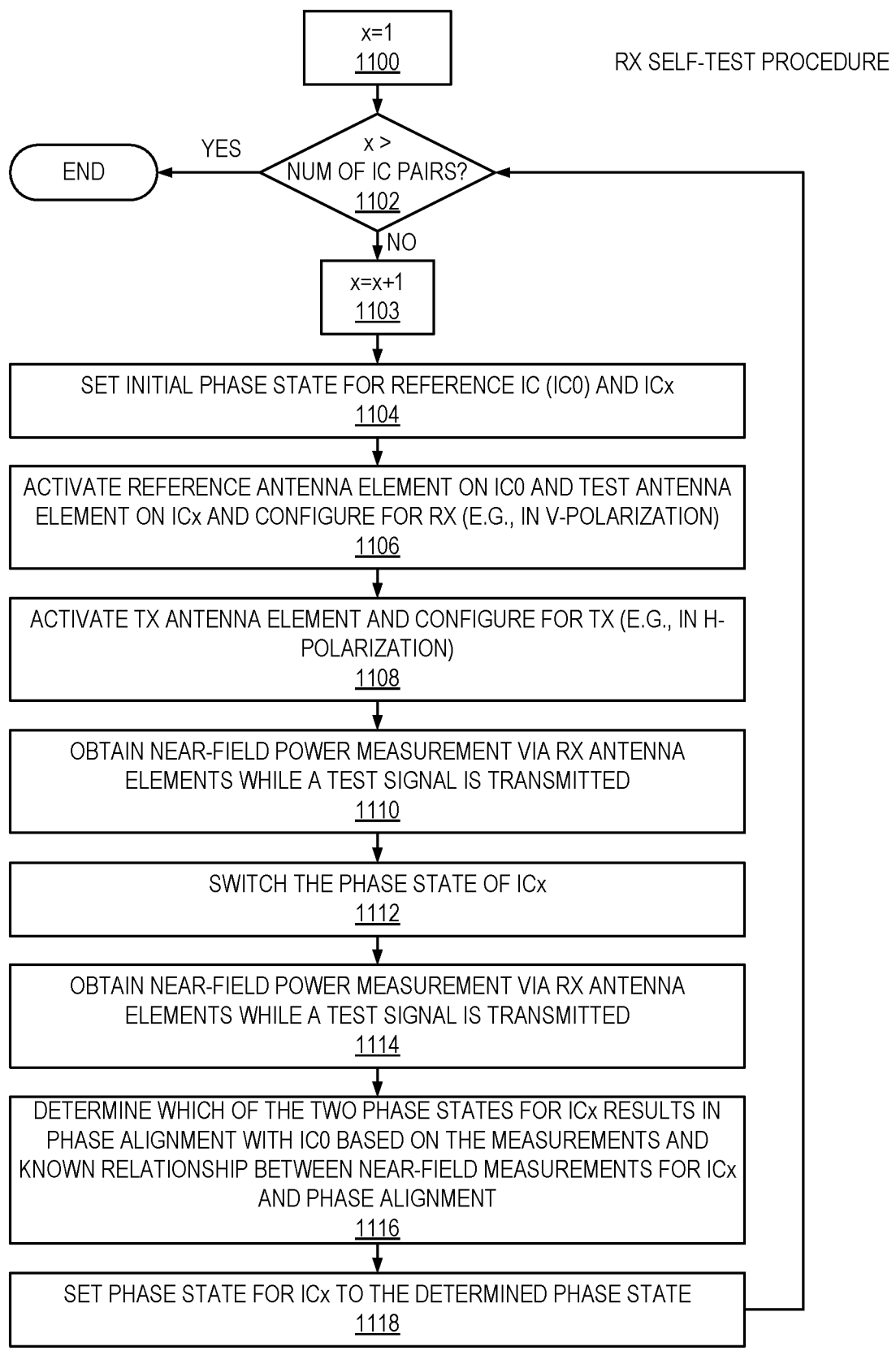
FIG. 11 is a flow chart that illustrates a self-test procedure for receive LOs in accordance with some embodiments of the present disclosure.

FIGS. 10 and 11 are flow charts that illustrate the self-test procedure of step 602 of FIG. 6 in more detail in accordance with some embodiments of the present disclosure. FIG. 10 illustrates a self-test procedure for the transmit LOs of the RFICs 104, and FIG. 11 illustrates a self-test procedure for the receive LOs of the RFICs 104.

As illustrated in FIG. 10, for transmit, the controller 504 of the characterization and self-test subsystem 502 initializes an index x to a value of 1 (step 1000). If the value of x is not greater than the number of RFIC pairs to be processed for the characterization procedure (step 1002, NO), the controller 504 increments x (step 1003) and sets an initial phase state for RFIC ICx to the first LO phase state (step 1004). The controller 504 activates the reference antenna element (e.g., AE1) on the reference RFIC IC1 and activates a test antenna element (e.g., AE1) on RFIC ICx and configures these two antenna elements as transmit antenna elements, e.g., in the H-polarization (step 1006). In addition, the controller 504 activates an antenna element either on RFIC IC1 or ICx (e.g., AE4 on RFIC IC1) and configures that antenna element as a receive antenna element, e.g., in the V-polarization (step 1008).

While a test signal is transmitted by the PAAM 100 using the two transmit antenna elements and the LO phase state of RFIC ICx is set to the first LO phase state, the characterization and self-test subsystem 502 obtains a first near-field power measurement ($P_{1,x,near}$) via the receive antenna element (step 1010). More specifically, the controller 504 causes the signal generator 506 to generate a test signal and provide the test signal to the PAAM 100 for transmission via the two transmit antenna elements. Due to coupling, a resulting signal is received at the receive antenna element. A power of this signal is measured in the PAAM 100 (e.g., in the respective RFIC) to thereby provide the first near-field power measurement ($P_{1,x,near}$), which is sent to the processing unit 500 and stored.

The controller 504 switches the LO phase state of the RFIC ICx from the first LO phase state to the second LO phase state such that the phase of the LO signal for the RFIC ICx is shifted by 180 degrees (step 1012). While a test signal is transmitted by the PAAM 100 using the two transmit antenna elements and the LO phase state of RFIC ICx is set to the second LO phase state, the characterization and self-test subsystem 502 obtains a second near-field power measurement ($P_{1,inv(x),near}$) via the receive antenna element (step 1014). More specifically, the controller 504 causes the signal generator 506 to generate a test signal and provide the test signal to the PAAM 100 for transmission via the two transmit antenna elements. Due to coupling, a resulting signal is received at the receive antenna element. A power of this signal is measured in the PAAM 100 (e.g., in the respective RFIC) to thereby provide the second near-field power measurement ($P_{1,inv(x),near}$), which is sent to the processing unit 500 and stored.

The controller 504 then determines which of the two near-field power measurements ($P_{1,x,near}$ and $P_{1,inv(x),near}$) result in LO phase alignment between the two RFICs IC1 and ICx based on the known relationship (e.g., $B_{1,x}$) between power level of the near-field power measurements for the RFIC pair (IC1,ICx) and LO phase alignment for the RFIC pair (IC1,ICx) (step 1016). For example, as discussed above, in some embodiments, the relationship is expressed as a Boolean value $B_{1,x}$, and the first LO phase state is determined to be the LO phase state that provides LO phase alignment if the expression ($P_{1,x,near}>P_{1,inv(x),near}$)==$B_{1,x}$ is TRUE. Otherwise, the second LO phase state is determined to be the LO phase state that provides LO phase alignment. The controller 504 then sets the LO phase state of RFIC ICx to the LO phase stated determined to be the LO phase state that provides LO phase alignment between RFIC IC1 and RFIC ICx (step 1018). The process returns to step 1002 and is repeated until the last RFIC pair has been processed.

As illustrated in FIG. 11, for receive self-test, the controller 504 of the characterization and self-test subsystem 502 initializes an index x to a value of 1 (step 1100). If the value of x is not greater than the number of RFIC pairs to be processed for the characterization procedure (step 1102, NO), the controller 504 increments x (step 1103) and sets an initial phase state for RFIC ICx to the first LO phase state (step 1104). The controller 504 activates the reference antenna element (e.g., AE1) on the reference RFIC IC1 and activates a test antenna element (e.g., AE1) on RFIC ICx and configures these two antenna elements as receive antenna elements, e.g., in the V-polarization (step 1106). In addition, the controller 504 activates an antenna element either on RFIC IC1 or ICx (e.g., AE4 on RFIC IC1) and configures that antenna element as a transmit antenna element, e.g., in the H-polarization (step 1108).

While a test signal is transmitted by the PAAM 100 using the transmit antenna element and the LO phase state of RFIC ICx is set to the first LO phase state, the characterization and self-test subsystem 502 obtains a first near-field power measurement ($P_{1,x,near}$) via the receive antenna elements (step 1110). More specifically, the controller 504 causes the signal generator 506 to generate a test signal and provide the test signal to the PAAM 100 for transmission via the transmit antenna element. Due to coupling, resulting signals are received at the receive antenna elements. These signals are combined, and the power of this combined signal is measured in the PAAM 100 to thereby provide the first near-field power measurement ($P_{1,x,near}$), which is sent to the processing unit 500 and stored.

The controller 504 switches the LO phase state of the RFIC ICx from the first LO phase state to the second LO phase state such that the phase of the LO signal for the RFIC ICx is shifted by 180 degrees (step 1112). While a test signal is transmitted by the PAAM 100 using the transmit antenna element and the LO phase state of RFIC ICx is set to the second LO phase state, the characterization and self-test subsystem 502 obtains a second near-field power measurement ($P_{1,inv(x),near}$) via the receive antenna elements (step 1114). More specifically, the controller 504 causes the signal generator 506 to generate a test signal and provide the test signal to the PAAM 100 for transmission via the transmit antenna element. Due to coupling, resulting signals are received at the receive antenna elements. These signals are combined, and a power of the combined signal is measured in the PAAM 100 (e.g., in the respective RFIC) to thereby provide the second near-field power measurement ($P_{1,inv(x),near}$), which is sent to the processing unit 500 and stored.

The controller 504 then determines which of the two near-field power measurements ($P_{1,x,near}$ and $P_{1,inv(x),near}$) result in LO phase alignment between the two RFICs IC1 and ICx based on the known relationship (e.g., $B_{1,x}$) between power level of the near-field power measurements for the RFIC pair (IC1,ICx) and LO phase alignment for the RFIC pair (IC1,ICx) (step 1116). For example, as discussed above, in some embodiments, the relationship is expressed as a Boolean value $B_{1,x}$, and the first LO phase state is determined to be the LO phase state that provides LO phase alignment if the expression ($P_{1,x,near}>P_{1,inv(x),near}$)==$B_{1-x}$ is TRUE. Otherwise, the second LO phase state is determined to be the LO phase state that provides LO phase alignment. The controller 504 then sets the LO phase state of RFIC ICx to the LO phase stated determined to be the LO phase state that provides LO phase alignment between RFIC IC1 and RFIC ICx (step 1118). The process returns to step 1102 and is repeated until the last RFIC pair has been processed.

Note that the basis for the characterization and self-test procedures described above with respect to FIGS. 7 through 11 is as follows. For characterization and self-testing in the transmit direction, the transfer function of a system with two transmit antenna elements (AE1 located in RFIC IC1, and AE2 located in RFIC IC2) and a single receive antenna element (AE4 located in RFIC IC1) can be expressed as:

$$Mx_{A1\_IC1,A1\_IC2} = Tx_{AE1\_IC1} C_{AE1\_IC1,AE4\_IC1} Rx_{AE4\_IC1} + Tx_{AE1\_IC2} C_{AE1\_IC2,AE4\_IC1} Rx_{AE4\_IC1} e^{i\Delta\varphi 1,2}$$

where:
- $Tx_{AE1\_IC1}$ is the transfer function of the transmit antenna element AE1 located in RFIC IC1 (see FIG. 7),
- $Tx_{AE1\_IC2}$ is the transfer function of the transmit antenna element AE1 located in RFIC IC2 (see FIG. 7),
- $C_{AE1\_IC1,AE4\_IC1}$ is the coupling between the transmit antenna element AE1 located in RFIC IC1 and the receive antenna element AE4 located in RFIC IC1,
- $C_{AE1\_IC2,AE4\_IC1}$ is the coupling between the transmit antenna element AE1 located in RFIC IC2 and the receive antenna element AE4 located in RFIC IC1,
- $Rx_{AE4\_IC1}$ is the transfer function of the receive antenna element AE4 located in RFIC IC1, $\Delta\varphi_{1,2}$ is the LO phase difference between RFIC IC1 and RFIC IC2

Provided that $\Delta\varphi_{1,2}$ is either 0 or $\pi$ radians, and assuming that the AAS 102 has already been calibrated, i.e. $Tx_{AE1\_IC1} \cong TX_{AE1\_IC2}$, the transfer function $Mx_{A1\_IC1,A1\_IC2}$ can be expressed as:

$$Mx_{A1\_IC1,A1\_IC2} = Tx_{AE1\_IC1}(C_{AE1\_IC1,AE4\_IC1} \pm C_{AE1\_IC2,AE4\_IC1})Rx_{AE4\_IC1}$$

Likewise, for the other RFIC pairs (IC1, IC3) and (IC1, IC4), the received signal at the receive antenna element can be expressed as:

$$Mx_{A1\_IC1,A1\_IC3} = Tx_{AE1\_IC1}(C_{AE1\_IC1,AE4\_IC1} \pm C_{AE1\_IC3,AE4\_IC1})Rx_{AE4\_IC1}$$

and $$Mx_{A1\_IC1,A1\_IC4} = Tx_{AE1\_IC1}(C_{AE1\_IC1,AE4\_IC1} \pm C_{AE1\_IC4,AE4\_IC1})Rx_{AE4\_IC1}$$

From the equations above, it can be seen that, if the transmit antenna elements and the receive antenna element are selected such that there is symmetrical coupling (i.e., such that $C_{IC1} \cong C_{IC2} \cong C_{IC3} \cong C_{IC4}$), then the power of the received signal will be small when ICx is in one LO phase state and relatively large when ICx is in the other phase state.

From the equations above, it can be seen that, as long as the couplings between the transmit antenna elements and the receive antenna element, i.e. $C_{AE1\_IC1,AE4\_IC1}$ and $C_{AE1\_IC2,AE4\_ICx}$, are not orthogonal to each other, the measured power of the received signal, which is proportional to the squared absolute value of the transfer function $Mx_{AE1\_IC1,AE1\_ICx}$, can have two distinct values based on whether the LO phase state in the RFIC ICx is the first LO phase state or it is the second LO phase state. In other words, one power value will correspond to one LO phase state of the RFIC ICx, and a different power value will correspond to the opposite LO phase state of the RFIC ICx.

For the specific case, when the couplings between the transmit antenna elements and the receive antenna element, i.e. $C_{AE1\_IC1,AE4\_IC1}$ and $C_{AE1\_IC2,AE4\_ICx}$, are "symmetrical," i.e. $C_{AE1\_IC1,AE4\_IC1} \approx C_{AE1\_IC1,AE4\_ICx}e^{jk\pi}$ $k=0,1$, the two possible power values will be further apart from each other, allowing for a larger margin and thus making the method less sensitive to, for example, noise or external interference. Therefore, this is the preferred scenario when choosing the transmit and receive antenna elements.

Figure 12:
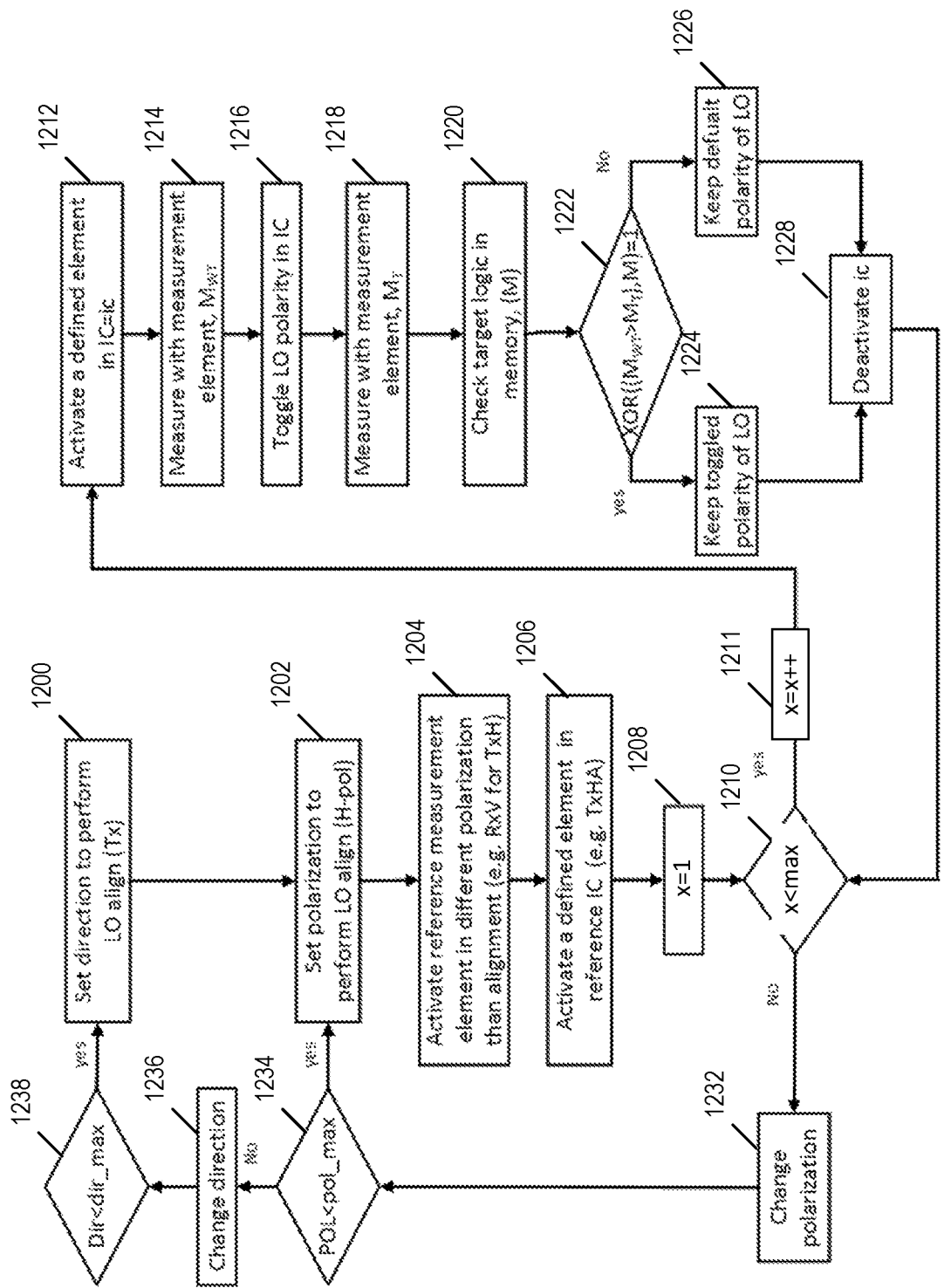
FIG. 12 is a flow chart that illustrates a self-test procedure in accordance with some other embodiments of the present disclosure.

Using this notation, FIG. 12 is a flow chart that illustrates the self-testing procedure of step 602 of FIG. 6 in accordance with some other embodiments of the present disclosure. As illustrated, the controller 504 of the characterization and self-test subsystem 502 sets a direction to perform LO phase alignment (step 1200) and set the polarization (e.g., H-polarization) (step 1202). The controller 504 activates a reference measurement antenna element in a different polarization than that set in step 1202 (e.g., V-polarization) (step 1204). The controller 504 activates a defined element in the reference RFIC IC1 (step 1206) and sets an RFIC index x=1 (step 1208).

If x≤max (where max is the maximum number of RFICs to be tested) (step 1210, YES), the controller 504 increments x (step 1211), and activates a defined antenna element in ICx (step 1212). The characterization and self-test subsystem 502 then obtains a first near-field power measurement for the RFIC pair (IC1,ICx) as described above (step 1214). The controller 504 toggles, or switches, the LO phase state of the RFIC ICx (step 1216) and obtains a second near-field power measurement for the RFIC pair (IC1,ICx) as described above (step 1218). The first and second near-field power measurements are checked against target logic (e.g., $B_{1,x}$) stored in memory (step 1220). In this case, if XOR (($M_{WT}$>$M_T$),M)=1 (step 1222, YES), then the polarity (i.e., the LO phase state) of RFIC ICx is kept at the toggled, or switched, LO phase state (step 1224). Otherwise (step 1222, NO), the polarity of RFIC ICx is set to the default state (i.e., the first LO phase state) (step 1226). RFIC ICx is then deactivated (step 1228), and the process returns to step 1210. Steps 1211 through 1228 are repeated for all of the RFICs to be tested. Once the last RFIC has been tested (i.e., step 1210, NO), the polarization is changed (step 1232) and the process returns (step 1234, YES) to step 1202 and the process is repeated for the new polarization. Once the last polarization is processed (step 1234, NO), the direction is changed (e.g., from transmit self-test to receive self-test) (step 1236) and, if both transmit and receive directions have not yet been processed (step 1238, YES), the process returns to step 1200 and is repeated for the new direction.

Figure 13:
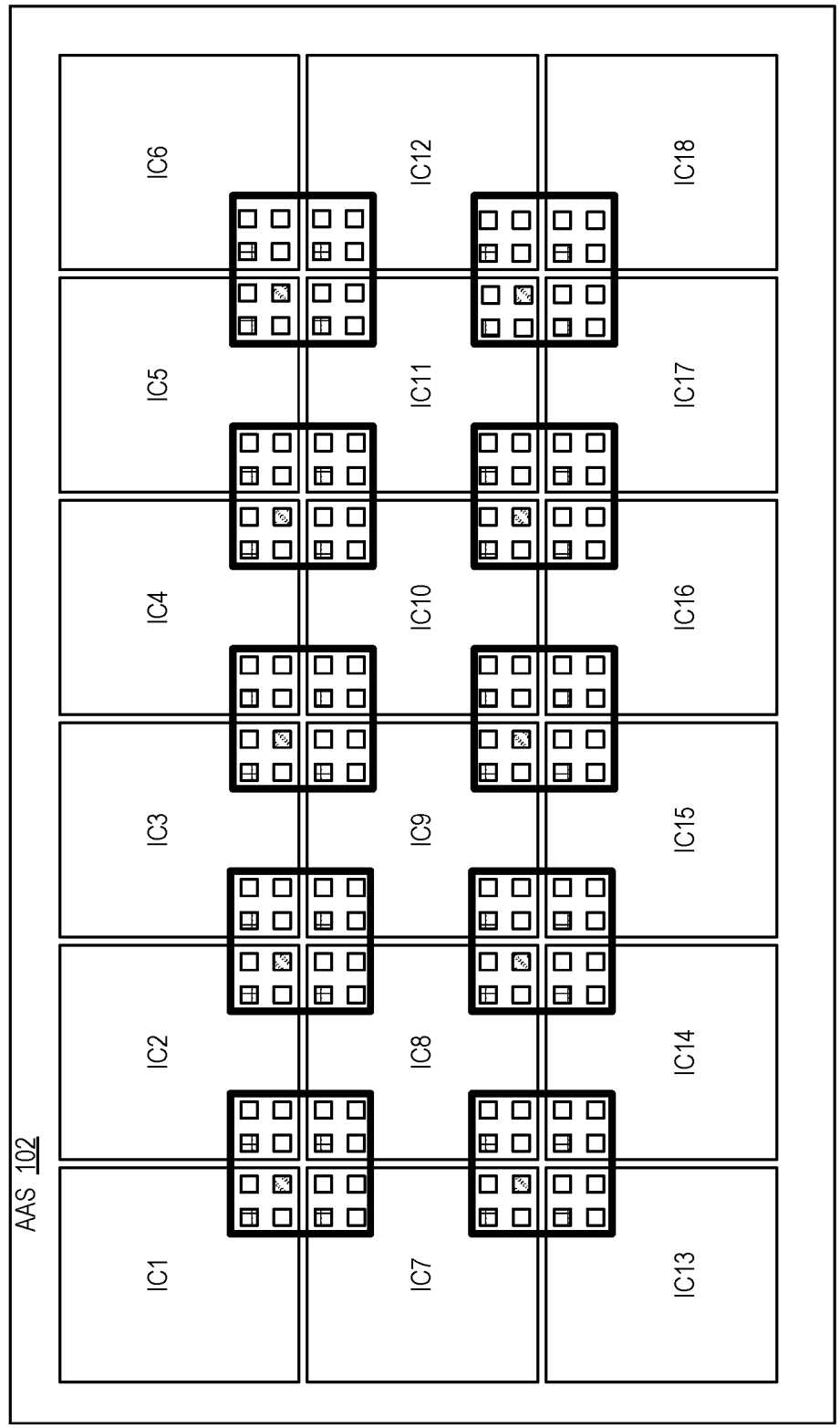
FIG. 13 graphically illustrates how the characterization and self-test procedures can be performed across many RFICs using one of the RFICs as a reference in accordance with some embodiments of the present disclosure.

FIG. 13 graphically illustrates one example of how the characterization and self-test procedures of FIGS. 7 through 12 can be performed across many RFICs 104 using one of the RFICs (e.g., 104-1) as a reference in accordance with some embodiments of the present disclosure. As illustrated, a first characterization/self-test is performed for RFICs IC2, IC7, and IC8 using RFIC IC1 as a reference;

a second characterization/self-test is performed for RFICs IC3 and IC9 using RFIC IC2 (or RFIC IC8) as the reference;

a third characterization/self-test is performed for RFICsIC4 and IC10 using RFIC IC3 (or RFIC IC9) as the reference;

a fourth characterization/self-test is performed for RFICsIC5 and IC11 using RFIC IC4 (or RFIC IC10) as the reference;

a fifth characterization/self-test is performed for RFICsIC6 and IC12 using RFIC IC5 (or RFIC IC11) as the reference;

a sixth characterization/self-test is performed for RFICs IC13 and IC14 using RFIC IC7 (or RFIC IC 8) as the reference;

a seventh characterization/self-test is performed for RFIC IC15 using RFIC IC8 (or RFIC IC9 or RFIC IC14) as the reference;

an eighth characterization/self-test is performed for RFIC IC16 using RFIC IC9 (or RFIC IC10 or RFIC IC15) as the reference;

a ninth characterization/self-test is performed for RFIC IC17 using RFIC IC10 (or RFIC IC11 or RFIC IC16) as the reference; and a tenth characterization/self-test is performed for RFIC IC18 using RFIC IC11 (or RFIC IC12 or RFIC IC17) as the reference.

In this manner, RFIC IC1 becomes the main reference RFIC such that the LO phases of all of the RFICs are, after self-testing, aligned with the LO phase of the RFIC IC1. Note that the example described above with respect to FIG. 13 is only an example. Any suitable pair-wise self-testing of the RFICs may be used.

Systems and methods are disclosed herein that provide a method for detecting and correcting LO phase misalignment between the RFICs 104 in the AAS 102. As described herein, a test signal is transmitted using different combinations of a limited number of transmit antenna elements and measured with different combinations of a limited number of receive antenna elements. Then, power of the resulting received signal is measured. This process may be repeated after inverting the LO phase state of one or more of the RFICs. Then, the measured power value(s) are compared with information that defines a known relationship between the measurement value(s) and the LO phase-alignment of the RFICs. From this comparison, the RFIC(s) for which the LO phase is misaligned can be determined, and the LO phases of those RFIC(s) can be corrected. This process can be performed with a small number of steps and measurements and, as such, is very fast.

While not being limited to or by any particular advantage, embodiments of the present disclosure provide a number of advantages. For example, embodiments disclosed herein enable self-testing and correction of LO phase misalignment between RFICs in the AAS. The embodiments disclosed herein can be used for either analog or digital beamforming. The embodiments disclosed herein require a small number of steps and measurements and, therefore, the correction can be made very quickly. Embodiments of the present disclosure enable detection and correction of LO phase misalignment between the RFICs of an AAS for both uplink and downlink when different frequency multipliers and/or dividers are used for uplink and downlink.

Figure 14:
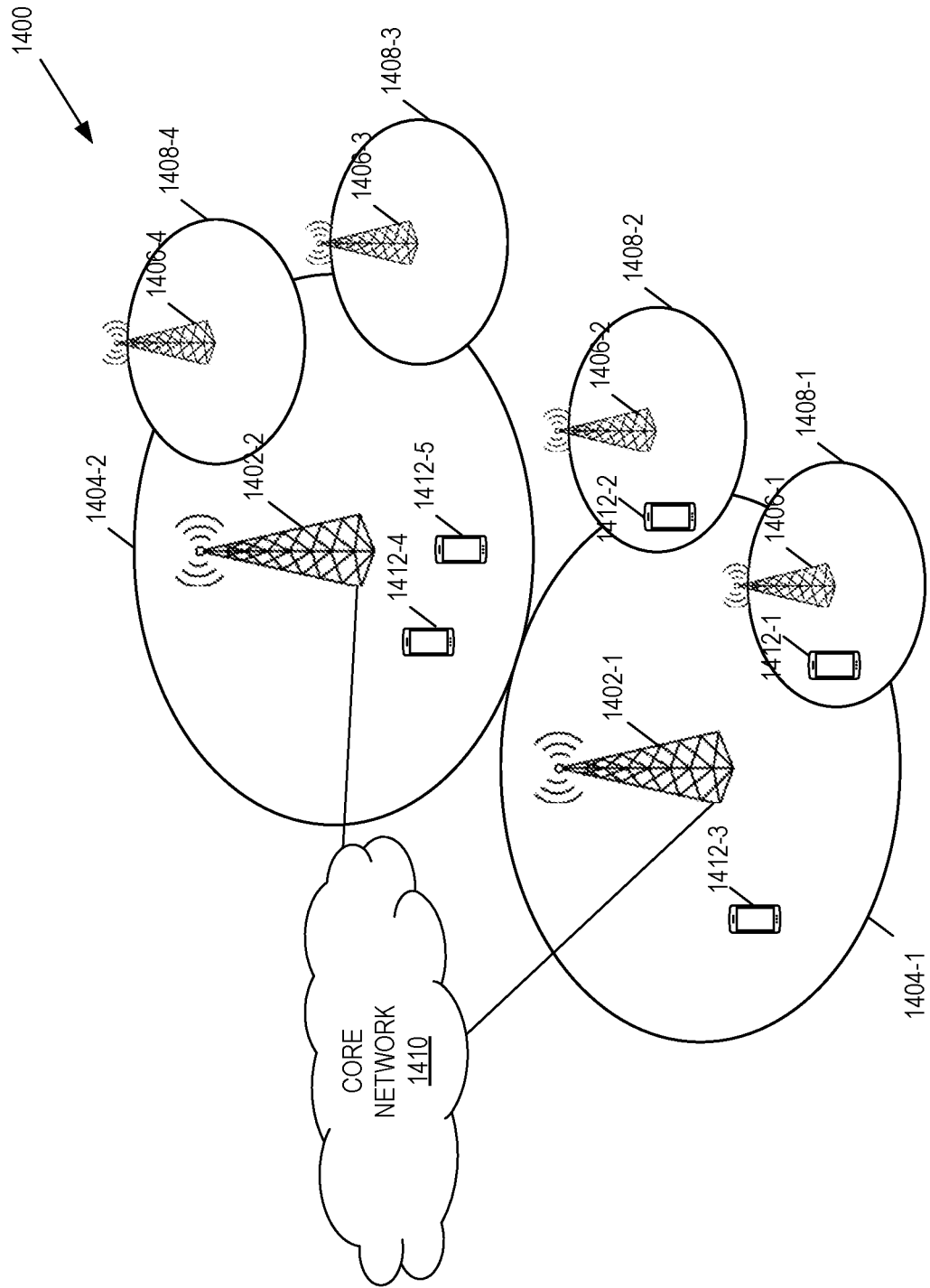
FIG. 14 illustrates one example of a cellular communications network according to some embodiments of the present disclosure.

FIG. 14 illustrates one example of a cellular communications network 1400 according to some embodiments of the present disclosure. In the embodiments described herein, the cellular communications network 1400 is a Fifth Generation (5G) New Radio (NR) network. In this example, the cellular communications network 1400 includes base stations 1402-1 and 1402-2, which in Long Term Evolution (LTE) are referred to as enhanced or evolved Node Bs (eNBs) and in 5G NR are referred to as NR base stations (gNBs), controlling corresponding macro cells 1404-1 and 1404-2. The base stations 1402-1 and 1402-2 are generally referred to herein collectively as base stations 1402 and individually as base station 1402. Likewise, the macro cells 1404-1 and 1404-2 are generally referred to herein collectively as macro cells 1404 and individually as macro cell 1404. The cellular communications network 1400 may also include a number of low power nodes 1406-1 through 1406-4 controlling corresponding small cells 1408-1 through 1408-4. The low power nodes 1406-1 through 1406-4 can be small base stations (such as pico or femto base stations) or Remote Radio Heads (RRHs), or the like. Notably, while not illustrated, one or more of the small cells 1408-1 through 1408-4 may alternatively be provided by the base stations 1402. The low power nodes 1406-1 through 1406-4 are generally referred to herein collectively as low power nodes 1406 and individually as low power node 1406. Likewise, the small cells 1408-1 through 1408-4 are generally referred to herein collectively as small cells 1408 and individually as small cell 1408. The base stations 1402 (and optionally the low power nodes 1406) are connected to a core network 1410.

The base stations 1402 and the low power nodes 1406 provide service to wireless devices 1412-1 through 1412-5 in the corresponding cells 1404 and 1408. The wireless devices 1412-1 through 1412-5 are generally referred to herein collectively as wireless devices 1412 and individually as wireless device 1412. The wireless devices 1412 are also sometimes referred to herein as User Equipment devices (UEs).

Figure 15:
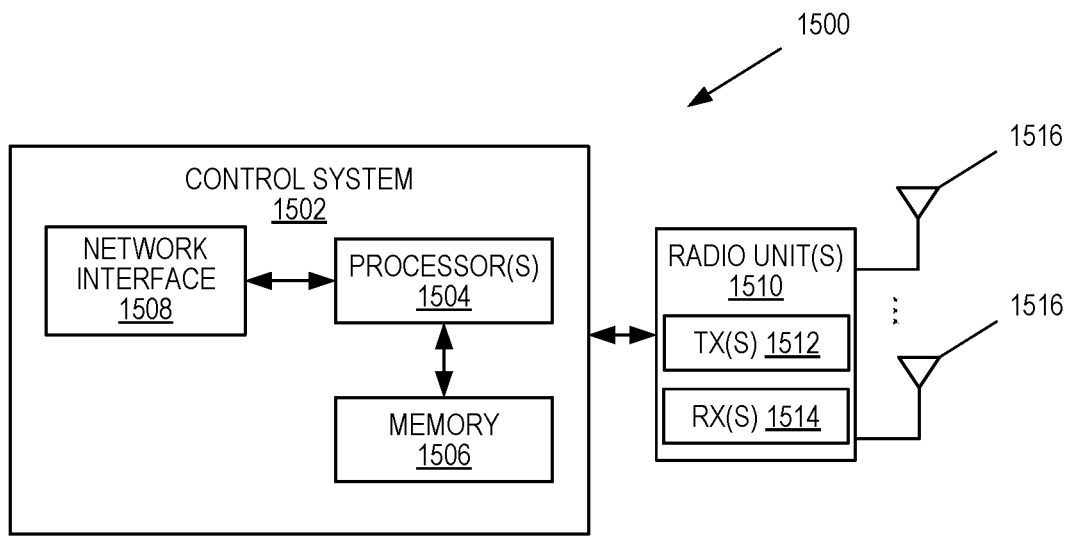
FIG. 15 is a schematic block diagram of a radio access node according to some embodiments of the present disclosure.

FIG. 15 is a schematic block diagram of a radio access node 1500 according to some embodiments of the present disclosure. The radio access node 1500 may be, for example, a base station 1402 or 1406. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 includes one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

Figure 16:
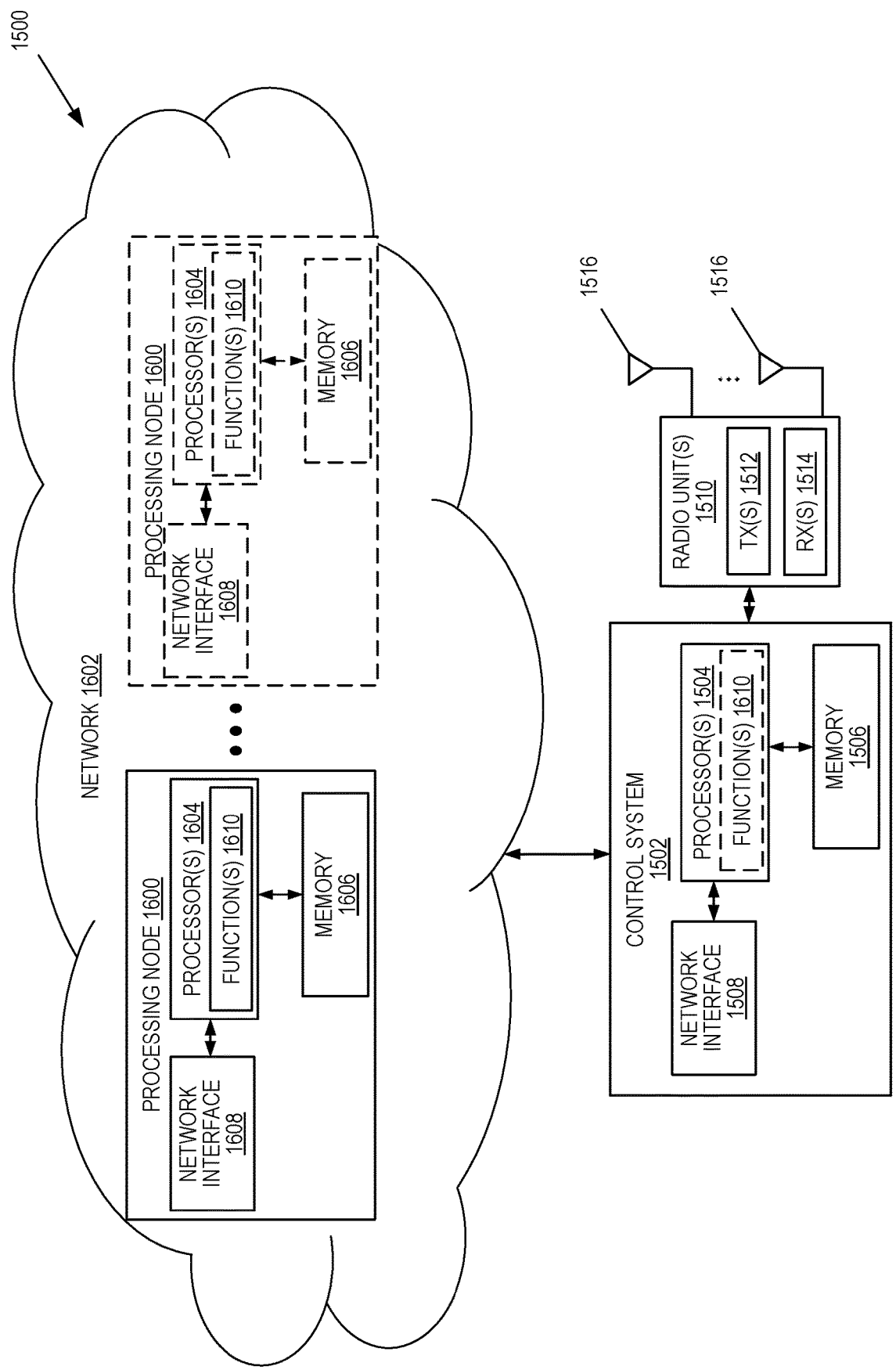
FIG. 16 is a schematic block diagram that illustrates a virtualized embodiment of the radio access node of FIG. 15 according to some embodiments of the present disclosure.

FIG. 16 is a schematic block diagram that illustrates a virtualized embodiment of the radio access node 1500 according to some embodiments of the present disclosure. This discussion is equally applicable to other types of network nodes. Further, other types of network nodes may have similar virtualized architectures.

As used herein, a "virtualized" radio access node is an implementation of the radio access node 1500 in which at least a portion of the functionality of the radio access node 1500 is implemented as a virtual component(s) (e.g., via a virtual machine(s) executing on a physical processing node(s) in a network(s)). As illustrated, in this example, the radio access node 1500 includes the control system 1502 that includes the one or more processors 1504 (e.g., CPUs, ASICs, FPGAs, and/or the like), the memory 1506, and the network interface 1508 and the one or more radio units 1510 that each includes the one or more transmitters 1512 and the one or more receivers 1514 coupled to the one or more antennas 1516, as described above. The control system 1502 is connected to the radio unit(s) 1510 via, for example, an optical cable or the like. The control system 1502 is connected to one or more processing nodes 1600 coupled to or included as part of a network(s) 1602 via the network interface 1508. Each processing node 1600 includes one or more processors 1604 (e.g., CPUs, ASICs, FPGAs, and/or the like), memory 1606, and a network interface 1608.

In this example, functions 1610 of the radio access node 1500 described herein are implemented at the one or more processing nodes 1600 or distributed across the control system 1502 and the one or more processing nodes 1600 in any desired manner. In some particular embodiments, some or all of the functions 1610 of the radio access node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of radio access node 1500 or a node (e.g., a processing node 1600) implementing one or more of the functions 1610 of the radio access node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
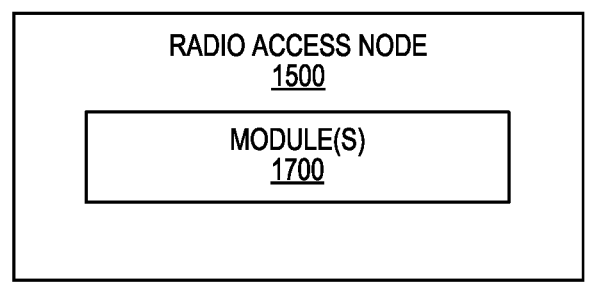
FIG. 17 is a schematic block diagram of the radio access node of FIG. according to some other embodiments of the present disclosure.

FIG. 17 is a schematic block diagram of the radio access node 1500 according to some other embodiments of the present disclosure. The radio access node 1500 includes one or more modules 1700, each of which is implemented in software. The module(s) 1700 provide the functionality of the radio access node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

5G Fifth Generation
AAS Advanced Antenna System
AE Antenna Element
AF Application Function
AMF Access and Mobility Management Function
AN Access Network
ASIC Application Specific Integrated Circuit
AUSF Authentication Server Function
CPU Central Processing Unit
DN Data Network
DSP Digital Signal Processor
eNB Enhanced or Evolved Node B
FPGA Field Programmable Gate Array
GHz Gigahertz
gNB New Radio Base Station
IF Intermediate Frequency
IP Internet Protocol
LO Local Oscillator
LTE Long Term Evolution
NEF Network Exposure Function
NF Network Function
NR New Radio
NRF Network Repository Function
NSSF Network Slice Selection Function
PAAM Phased Antenna Array Module
PCF Policy Control Function
QoS Quality of Service
RAM Random Access Memory
RAN Radio Access Network
RF Radio Frequency
RFIC Radio Frequency Integrated Circuit
ROM Read Only Memory
RRH Remote Radio Head
RTT Round Trip Time
SMF Session Management Function
UDM Unified Data Management
UE User Equipment Those skilled in the art will recognize improvements and modifications to the embodiments of the present disclosure. All such improvements and modifications are considered within the scope of the concepts disclosed herein.

What is claimed is:

1. A radio system comprising:
    a processing unit; and
    two or more Radio Frequency Integrated Circuits (RFICs) wherein each RFIC comprises:
        Local Oscillator (LO) generation circuitry configured to generate a LO signal; and
        processing circuitry configured to, based on the LO signal, upconvert signals to be transmitted via a plurality of antenna elements for the RFIC and/or downconvert signals received via the plurality of antenna elements for the RFIC; and
    wherein the processing unit is adapted to, for a first RFIC pair comprising two of the two or more RFICs, namely a first RFIC and a second RFIC:
        obtain a first power measurement for the first RFIC pair of a first test signal via a receive antenna element for either the first RFIC or the second RFIC, wherein the first test signal is transmitted via a first transmit antenna element for the first RFIC and a second transmit antenna element for the second RFIC and a phase state of the second RFIC is a first LO phase state,
        obtain a second power measurement for the first RFIC pair of a second test signal via the receive antenna element, wherein the second test signal is transmitted via the first transmit antenna element and the second transmit antenna element and the phase state of the second RFIC is a second LO phase state; and
        set the phase state of the second RFIC to a determined LO phase state based on the first power measurement and the second power measurement.

2. The radio system of claim 1, wherein the second LO phase state is shifted by 180 degrees relative to the first LO phase state.

3. The radio system of claim 1, wherein the first transmit antenna element, the second transmit antenna element, and the receive antenna element are such that a coupling between the first transmit antenna element and the receive antenna element is symmetrical to a coupling between the second transmit antenna element and the receive antenna element.

4. The radio system of claim 1, wherein for each RFIC of the two or more RFICs, the plurality of antenna elements for the RFIC are dual-polarized antenna elements, the first antenna element and the second transmit antenna element are configured in a first polarization, and the receive antenna element is configured in a second polarization opposite to the first polarization.

5. The radio system of claim 1, wherein:
a predetermined relationship between the first power measurement and the second power measurement and a phase alignment between the LO signals for the first RFIC and the second RFIC is that:
if the first power measurement is greater than the second power measurement, then the phases of the LO signals for the first RFIC and the second RFIC are misaligned when the phase state of the second RFIC is the first LO phase state and aligned when the phase state of the second RFIC is the second LO phase state; and
if the first power measurement is not greater than the second power measurement, then the phases of the LO signals for the first RFIC and the second RFIC are aligned when the phase state of the second RFIC is the first LO phase state and misaligned when the phase state of the second RFIC is the second LO phase state; and
the determined LO phase state for the second RFIC is:
the second LO phase state if the first power measurement is greater than the second power measurement; and
the first LO phase state if the first power measurement is not greater than the second power measurement.

6. The radio system of claim 1, wherein:
a predetermined relationship between the first power measurement and the second power measurement, and a phase alignment between the LO signals for the first RFIC and the second RFIC is that:
if the first power measurement is greater than the second power measurement, then the phases of the LO signals for the first RFIC and the second RFIC are aligned when the phase state of the second RFIC is the first LO phase state and misaligned when the phase state of the second RFIC is the second LO phase state; and
if the first power measurement is not greater than the second power measurement, then the phases of the LO signals for the first RFIC and the second RFIC are misaligned when the phase state of the second RFIC is the first LO phase state and aligned when the phase state of the second RFIC is the second LO phase state; and
the determined LO phase state for the second RFIC is:
the first LO phase state if the first power measurement is greater than the second power measurement; and
the second LO phase state if the first power measurement is not greater than the second power measurement.

7. The radio system of claim 1, wherein the processing unit is further adapted to, for a second RFIC pair comprising two of the two or more RFICs, namely the first RFIC and a third RFIC:
obtain a first power measurement for the second RFIC pair via a receive antenna element for the second RFIC pair while a test signal is transmitted via a first transmit antenna element for the second RFIC pair and a second transmit antenna element for the second RFIC pair and a phase state of the third RFIC is a first LO phase state;
obtain a second power measurement for the second RFIC pair via the receive antenna element for the second RFIC pair wherein a test signal is transmitted via the first transmit antenna element for the second RFIC pair and the second transmit antenna element for the second RFIC pair and the phase state of the third RFIC is a second LO phase state, wherein the second LO phase state is a state in which a phase of the LO signal for the third RFIC is shifted by 180 degrees relative to the phase of the LO signal for the third RFIC when the phase state of the third RFIC is the first LO phase state; and
set the phase state of the third RFIC to the determined LO phase state.

8. A radio system comprising two or more Radio Frequency Integrated Circuits (RFICs) wherein each RFIC comprises:
Local Oscillator (LO) generation circuitry configured to generate a LO signal; and
processing circuitry configured to, based on the LO signal, upconvert signals to be transmitted via a plurality of antenna elements or the RFIC and/or downconvert signals received via the plurality of antenna elements for the RFIC; and
a processing unit adapted to, for a first RFIC pair comprising two of the two or more RFICs, namely a first RFIC and a second RFIC:
obtain a first power measurement for the first RFIC pair of a first test signal via a first receive antenna element for the first RFIC and a second receive antenna element for the second RFIC while the first test signal is transmitted via a transmit antenna element for either the first RFIC or the second RFIC and a phase state of the second RFIC is a first LO phase state;
obtain a second power measurement for the first RFIC pair of a second test signal via the first receive antenna element and the second receive antenna element, wherein the second test signal is transmitted via the transmit antenna element and the phase state of the second RFIC is a second LO phase state; and
set the phase state of the second RFIC to a determined LO phase state based on the first power measurement and the second power measurement.

9. The radio system of claim 8, wherein the second LO phase state is shifted by 180 degrees relative to the first LO phase state.

10. The radio system of claim 8, wherein the first receive antenna element, the second receive antenna element, and the transmit antenna element are such that a coupling between the first receive antenna element and the transmit antenna element is symmetrical to a coupling between the second receive antenna element and the transmit antenna element.

11. The radio system of claim 8, wherein for each RFIC of the two or more RFICs, the plurality of antenna elements for the RFIC are dual-polarized antenna elements, the first receive antenna element and the second receive antenna element are configured in a first polarization, and the transmit antenna element is configured in a second polarization which is a polarization that is opposite to the first polarization.

12. The radio system of claim 8, wherein:
a predetermined relationship between the first power measurement and the second power measurement and a phase alignment between the LO signals for the first RFIC and the second RFIC is that:

if the first power measurement is greater than the second power measurement, then the phases of the LO signals for the first RFIC and the second RFIC are misaligned when the phase state of the second RFIC is the first LO phase state and aligned when the phase state of the second RFIC is the second LO phase state; and if the first power measurement is not greater than the second power measurement, then the phases of the LO signals for the first RFIC and the second RFIC are aligned when the phase state of the second RFIC is the first LO phase state and misaligned when the phase state of the second RFIC is the second LO phase state; and the determined phase state for the second RFIC is:
the second LO phase state if the first power measurement is greater than the second power measurement; and
the first LO phase state if the first power measurement is not greater than the second power measurement.

13. The radio system of claim 8, wherein:
a predetermined relationship between the first power measurement and the second power measurement and a phase alignment between the LO signals for the first RFIC and the second RFIC is that:
if the first power measurement is greater than the second power measurement, then the phases of the LO signals for the first RFIC and the second RFIC are aligned when the phase state of the second RFIC is the first LO phase state and misaligned when the phase state of the second RFIC is the second LO phase state; and
if the first power measurement is not greater than the second power measurement, then the phases of the LO signals for the first RFIC and the second RFIC are misaligned when the phase state of the second RFIC is the first LO phase state and aligned when the phase state of the second RFIC is the second LO phase state; and
the determined phase state for the second RFIC is:
the first LO phase state if the first power measurement is greater than the second power measurement; and
the second LO phase state if the first power measurement is not greater than the second power measurement.

14. The radio system of claim 8, wherein the processing unit is further adapted to, for a second RFIC pair comprising two of the two or more RFICs, namely the first RFIC and a third RFIC:
obtain a first power measurement for the second RFIC pair via a first receive antenna element for the second RFIC pair and a second receive antenna element for the second RFIC pair while a test signal is transmitted via a transmit antenna element for the second RFIC pair and a phase state of the third RFIC is a first LO phase state;
obtain a second power measurement via the first receive antenna element for the second RFIC pair and the second receive antenna element for the second RFIC pair, wherein a test signal is transmitted via the transmit antenna element for the second RFIC pair and the phase state of the third RFIC is a second LO phase state, wherein the second LO phase state is a state in which a phase of the LO signal for the third RFIC is shifted by 180 degrees relative to the phase of the LO signal for the third RFIC when the phase state of the third RFIC is the first LO phase state; and set the phase state of the third RFIC to the determined LO phase state.

15. A method for self-testing of a system comprising a radio system comprising two or more Radio Frequency Integrated Circuits (RFICs) each comprising Local Oscillator (LO) generation circuitry configured to generate a LO signal, and processing circuitry configured to, based on the LO signal, upconvert signals to be transmitted via a plurality of antenna elements for the RFIC and/or downconvert signals received via the plurality of antenna elements for the RFIC, wherein the method comprises, for a first RFIC pair comprising two of the two or more RFICs, namely a first RFIC and a second RFIC:
obtaining a first power measurement for the first RFIC pair of a first test signal via a receive antenna element for the first RFIC pair while the first test signal is transmitted via a first transmit antenna element for the first RFIC pair and a second transmit antenna element for the first RFIC pair and a phase state of the second RFIC is a first LO phase state;
obtaining a second power measurement for the first RFIC pair of a second test signal via the receive antenna element, wherein the second test signal is transmitted via the first transmit antenna element and the second transmit antenna element and the phase state of the second RFIC is a second LO phase state; and
setting the phase state of the second RFIC to a determined LO phase state based on the first power measurement and the second power measurement.

16. The method of claim 15, wherein the second LO phase state is shifted by 180 degrees relative to the first LO phase state.

17. The method of claim 15, wherein the first transmit antenna element, the second transmit antenna element, and the receive antenna element are such that a coupling between the first transmit antenna element and the receive antenna element is symmetrical to a coupling between the second transmit antenna element and the receive antenna element.

18. The method of claim 15, wherein for each RFIC of the two or more RFICs, the plurality of antenna elements for the RFIC are dual-polarized antenna elements, the first transmit antenna element and the second transmit antenna elements are configured in a first polarization, and the receive antenna element is configured in a second polarization which is a polarization that is opposite to the first polarization.

19. The method of claim 15, wherein:
a predetermined relationship between the first power measurement and the second power measurement and a phase alignment between the LO signals for the first RFIC and the second RFIC is that:
if the first power measurement is greater than the second power measurement, then the phases of the LO signals for the first RFIC and the second RFIC are misaligned when the phase state of the second RFIC is the first LO phase state and aligned when the phase state of the second RFIC is the second LO phase state; and
if the first power measurement is not greater than the second power measurement, then the phases of the LO signals for the first RFIC and the second RFIC are aligned when the phase state of the second RFIC is the first LO phase state and misaligned when the phase state of the second RFIC is the second LO phase state; and
determining which of the first LO phase state and the second LO phase state for the second RFIC results in phase alignment between the LO signals for the first RFIC and the second RFIC comprises:
determining that the second LO phase state for the second RFIC results in phase alignment between the LO signals for the first RFIC and the second RFIC if the first power measurement is greater than the second power measurement; and
determining that the first LO phase state for the second RFIC results in phase alignment between the LO signals for the first RFIC and the second RFIC if the first power measurement is not greater than the second power measurement.

20. The method of claim 15, wherein:
a predetermined relationship between the first power measurement and the second power measurement and a phase alignment between the LO signals for the first RFIC and the second RFIC is that:
if the first power measurement is greater than the second power measurement, then the phases of the LO signals for the first RFIC and the second RFIC are aligned when the phase state of the second RFIC is the first LO phase state and misaligned when the phase state of the second RFIC is the second LO phase state; and
if the first power measurement is not greater than the second power measurement, then the phases of the LO signals for the first RFIC and the second RFIC are misaligned when the phase state of the second RFIC is the first LO phase state and aligned when the phase state of the second RFIC is the second LO phase state; and
determining which of the first LO phase state and the second LO phase state for the second RFIC results in phase alignment between the LO signals for the first RFIC and the second RFIC comprises:
determining that the first LO phase state for the second RFIC results in phase alignment between the LO signals for the first RFIC and the second RFIC if the first power measurement is greater than the second power measurement; and
determining that the second LO phase state for the second RFIC results in phase alignment between the LO signals for the first RFIC and the second RFIC if the first power measurement is not greater than the second power measurement.

21. A base station comprising:
a radio system that comprises:
a processing unit; and
two or more Radio Frequency Integrated Circuits (RFICs) wherein each RFIC comprises:
Local Oscillator (LO) generation circuitry configured to generate a LO signal; and
processing circuitry configured to, based on the LO signal:
upconvert signals to be transmitted via a plurality of antenna elements for the RFIC and/or downconvert signals received via the plurality of antenna elements for the RFIC; and
wherein the processing unit is adapted to, for a first RFIC pair comprising two of the two or more RFICs, namely a first RFIC and a second RFIC:
obtain a first power measurement for the first RFIC pair of a first test signal via a receive antenna element for either the first RFIC or the second RFIC, wherein the first test signal is transmitted via a first transmit antenna element for the first RFIC and a second transmit antenna element for the second RFIC and a phase state of the second RFIC is a first LO phase state,
obtain a second power measurement for the first RFIC pair of a second test signal via the receive antenna element, wherein the second test signal is transmitted via the first transmit antenna element and the second transmit antenna element and the phase state of the second RFIC is a second LO phase state; and
set the phase state of the second RFIC to a determined LO phase state based on the first power measurement and the second power measurement.

* * * * *